US012563590B2

(12) United States Patent
Myung et al.

(10) Patent No.: US 12,563,590 B2
(45) Date of Patent: Feb. 24, 2026

(54) APPARATUS AND METHOD FOR TRANSMISSION OR RECEPTION OF DATA AND CONTROL SIGNAL IN COMMUNICATION SYSTEM

(71) Applicant: Samsung Electronics Co., Ltd., Suwon-si (KR)

(72) Inventors: Seho Myung, Suwon-si (KR); Younsun Kim, Suwon-si (KR); Jeongho Yeo, Suwon-si (KR); Yangsoo Kwon, Suwon-si (KR); Kyungjoong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 17/881,163

(22) Filed: Aug. 4, 2022

(65) Prior Publication Data

US 2022/0400512 A1      Dec. 15, 2022

Related U.S. Application Data

(63) Continuation of application No. PCT/KR2021/001842, filed on Feb. 10, 2021.

(30) Foreign Application Priority Data

Feb. 12, 2020    (KR) ........................ 10-2020-0017153

(51) Int. Cl.
*H04W 74/00* (2009.01)
*H04W 74/04* (2009.01)

(52) U.S. Cl.
CPC ......... *H04W 74/006* (2013.01); *H04W 74/04* (2013.01)

(58) Field of Classification Search
None
See application file for complete search history.

(56) References Cited

U.S. PATENT DOCUMENTS 8,578,257 B2    11/2013   Kim et al.
8,811,321 B2    8/2014    Koo et al.
(Continued)

FOREIGN PATENT DOCUMENTS

EP        3 471 304 A1    4/2019
KR    10-2012-0127391 A    11/2012
(Continued)

OTHER PUBLICATIONS

Nokia, 'Introduction of NR enhanced MIMO', R1-1913203, 3GPP TSG RAN WG1 Meeting #99, Reno, USA, Nov. 12, 2019.
(Continued)

*Primary Examiner* — The Hy Nguyen
(74) *Attorney, Agent, or Firm* — Jefferson IP Law, LLP

(57) ABSTRACT

The disclosure relates to a 5G or pre-5G communication system for supporting a higher data transmission rate than that of a beyond-4th 4G communication system such as a LTE. The system transmits or receives data and control information in a wireless or communication system. An operation method of a terminal is provided. The operation method includes determining the number ($N_{RE}$) of REs allocated to the terminal, determining an intermediate value based on the number of Res, when the intermediate value is smaller than a first reference value, determining the size of a transport block based on a predetermined first method and the intermediate value, or determining the size of the transport block based on the intermediate value and a plurality of predetermined values, and when the intermediate value is greater than the first reference value, determining the size of the transport block on the basis of the intermediate value.

10 Claims, 18 Drawing Sheets

(56) References Cited

U.S. PATENT DOCUMENTS

| | | | |
|---|---|---|---|
| 10,291,376 | B2 | 5/2019 | Seo et al. |
| 11,190,300 | B2 | 11/2021 | Hwang et al. |
| 2012/0044883 | A1 | 2/2012 | Jang et al. |
| 2015/0181574 | A1 | 6/2015 | Lee et al. |
| 2019/0081729 | A1* | 3/2019 | Salah .................... H04L 5/0046 |
| 2021/0345259 | A1 | 11/2021 | Yeo et al. |
| 2021/0368523 | A1* | 11/2021 | Yoshioka .......... H04W 72/0446 |
| 2023/0043797 | A1* | 2/2023 | Myung ................ H04L 1/0067 |
| 2023/0079557 | A1* | 3/2023 | Guo ........................ H04W 8/24 |
| | | | 370/329 |

FOREIGN PATENT DOCUMENTS

| | | |
|---|---|---|
| KR | 10-1663617 B1 | 10/2016 |
| KR | 10-1846167 B1 | 4/2018 |
| KR | 10-2019-0038217 A | 4/2019 |
| WO | 2014/027810 A1 | 2/2014 |

OTHER PUBLICATIONS

3GPP TS 36.213 V8.8.0 (Sep. 2009) 3rd Generation Partnership Project; Technical Specification Group Radio Access Network; Evolved Universal Terrestrial Radio Access (E-UTRA); Physical layer procedures (Release 8), Sep. 2009.

3GPP TS 38.214 V15.6.0 (Jun. 2019) 3rd Generation Partnership Project; Technical Specification Group Radio Access Network; NR; Physical layer procedures for data (Release 15), Jun. 2019.

3GPP TS 38.212 V15.6.0 (Jun. 2019) 3rd Generation Partnership Project; Technical Specification Group Radio Access Network; NR; Multiplexing and channel coding (Release 15), Jun. 2019.

Korean Notice of Allowance dated Nov. 19, 2024, issued in Korean Patent Application No. 10-2020-0017153.

* cited by examiner

Generate parity symbol by encoding
symbols at same position or predetermined
position with second channel code 802    804

CB 1    CB 2    CB 3    ...    CB N-1    CB N    PCB 1    ...    PCB M

806    CRC    CRC    CRC    CRC    CRC    CRC    CRC    808

CBs segmented from
TB and added CRC

Parity code blocks generated
by second channel code

APPARATUS AND METHOD FOR TRANSMISSION OR RECEPTION OF DATA AND CONTROL SIGNAL IN COMMUNICATION SYSTEM

CROSS-REFERENCE TO RELATED APPLICATION(S)

This application is a continuation application, claiming priority under § 365(c), of an International application No. PCT/KR2021/001842, filed on Feb. 10, 2021, which is based on and claims the benefit of a Korean patent application number 10-2020-0017153, filed on Feb. 12, 2020, in the Korean Intellectual Property Office, the disclosure of which is incorporated by reference herein in its entirety.

BACKGROUND

1. Field

The disclosure relates to a communication system. More particularly, the disclosure relates to a method and apparatus for transmitting and receiving data and control information in a communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in extremely high frequency (mmWave) bands (e.g., 60 GHz band) so as to accomplish higher data rates. To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system.

In addition, in the 5G communication systems, development for system network improvement is under way based on an advanced small cell, a cloud radio access network (cloud RAN), an ultra-dense network, device-to-device (D2D) communication, wireless backhaul, moving network, cooperative communication, coordinated multi-points (CoMP), reception-end interference cancellation, and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As wireless communication systems such as the 5G systems develop, it is expected to be able to provide a variety of services. Accordingly, there is a need for a method for smoothly providing such services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for effectively determining the size of a transport block in a wireless or wired communication system.

Another aspect of the disclosure is to provide an apparatus and method for effectively determining the size of a code block in a wireless or wired communication system.

Another aspect of the disclosure is to provide an apparatus and method for effectively performing rate matching in a wireless or wired communication system.

Another aspect of the disclosure is to provide an apparatus and method for limiting transmittable parity bits in a wireless or wired communication system.

Additional aspects will be set forth in part in the description which follows and, in part, will be apparent from the description, or may be learned by practice of the presented embodiments.

In accordance with an aspect of the disclosure, an operation method of a terminal or a base station in a wireless or wired communication system is provided. The operation method includes determining an intermediate value based on some parameters determined in the system, comparing the intermediate value with a first reference value, calculating a transport block size based on the intermediate value and a predetermined rule in case that the intermediate value is smaller than or equal to the first reference value, and configuring as one of a plurality of predetermined transport block sizes based on a result of calculation based on the intermediate value and the predetermined rule in case that the intermediate value is greater than the first reference value.

In accordance with another aspect of the disclosure, a terminal or a base station in a wireless or wired communication system is provided. The terminal includes a transceiver and at least one processor connected to the transceiver. The at least one processor may perform determining an intermediate value based on some parameters determined in the system, comparing the intermediate value with a first reference value, calculating a transport block size based on the intermediate value and a predetermined rule in case that the intermediate value is smaller than or equal to the first reference value, and configuring as one of a plurality of predetermined transport block sizes based on a result of calculation based on the intermediate value and the predetermined rule in case that the intermediate value is greater than the first reference value.

In accordance with another aspect of the disclosure, a method of a terminal in a wireless communication system is provided. The method includes determining a number (NRE) of resource elements (RE) allocated to the terminal, determining an intermediate value based on the number of the REs, in case that the intermediate value is smaller than a first reference value, determining a size of a transport block based on a predetermined first method and the intermediate value, or determining the size of the transport block based on the intermediate value and a plurality of predetermined values, and in case that the intermediate value is greater than the first reference value, determining the size of the transport block based on the intermediate value.

In accordance with another aspect of the disclosure, a terminal in a wireless communication system is provided. The terminal includes a transceiver and a controller configured to determine a number (NRE) of resource elements (RE) allocated to the terminal, to determine an intermediate value based on the number of the REs, in case that the intermediate value is smaller than a first reference value, to determine a size of a transport block based on a predetermined first method and the intermediate value, or determine the size of the transport block based on the intermediate value and a plurality of predetermined values, and in case that the intermediate value is greater than the first reference value, to determine the size of the transport block based on the intermediate value.

In accordance with another aspect of the disclosure, an operation method of a terminal or a base station in a wireless or wired communication system is provided. The operation method includes determining an intermediate value based on some parameters determined in the system, determining a value corresponding to a low density parity check (LDPC) parity check matrix indicator based on the intermediate value and a predetermined rule, and determining a size of a code block based on a value corresponding to the LDPC parity check matrix indicator and a predetermined rule.

In accordance with another aspect of the disclosure, a terminal or a base station in a wireless or wired communication system is provided. The terminal includes a transceiver and at least one processor connected to the transceiver. The at least one processor may determine an intermediate value based on some parameters determined in the system, determine a value corresponding to an LDPC parity check matrix indicator based on the intermediate value and a predetermined rule, and determine a size of a code block based on a value corresponding to the LDPC parity check matrix indicator and a predetermined rule.

In accordance with another aspect of the disclosure, an operation method of a terminal in a wireless or wired communication system is provided. The operation method includes receiving an indication for limited buffer rate matching (LBRM) from a base station, acquiring at least one parameter required to perform the LBRM, determining a limited range of parity bits for the LBRM based on the parameters, and transmitting or receiving data based on the limited range.

In accordance with another aspect of the disclosure, a terminal in a wireless or wired communication system is provided. The terminal includes a transceiver and at least one processor connected to the transceiver. The at least one processor may receive an indication for limited buffer rate matching (LBRM) from a base station, acquire at least one parameter required to perform the LBRM, determine a limited range of parity bits for the LBRM based on the parameters, and transmit or receive data based on the limited range.

An apparatus and method according to various embodiments of the disclosure can effectively perform rate matching using limited parity bits.

Other aspects, advantages, and salient features of the disclosure will become apparent to those skilled in the art from the following detailed description, which taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates an example of a process in which one transport block (TB) is encoded in a wireless communication system according to an embodiment of the disclosure;

The same reference numerals are used to represent the same elements throughout the drawings.

DETAILED DESCRIPTION

Figure 1:
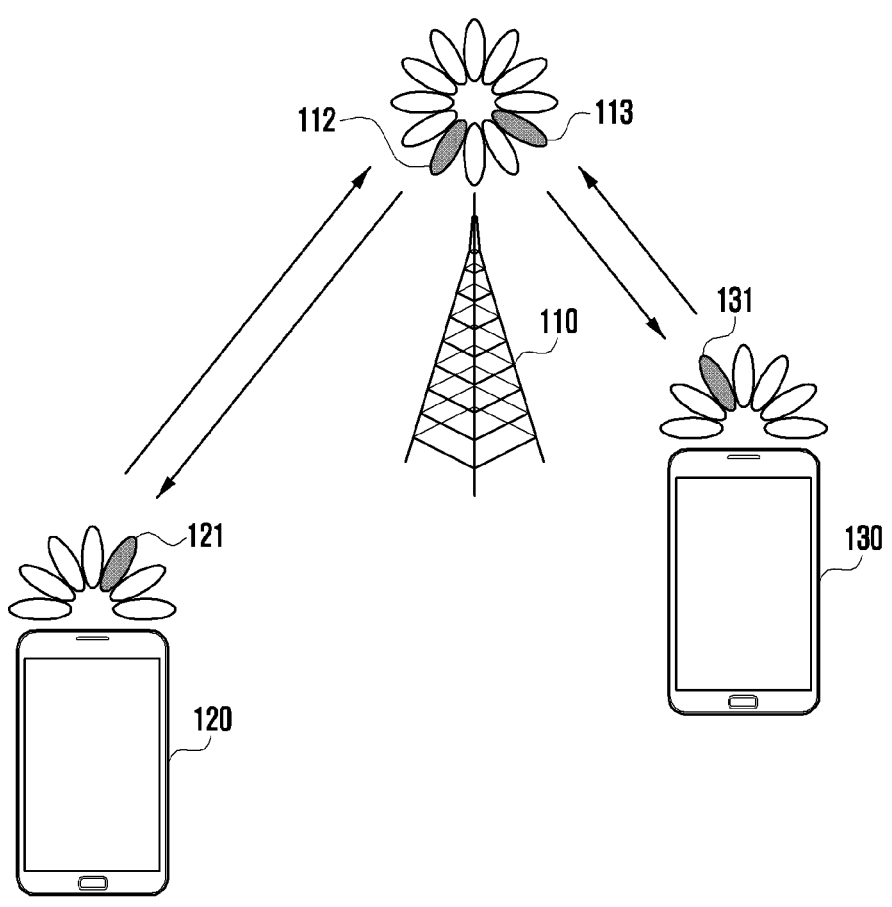
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein, including technical or scientific terms, may have the same meanings as commonly understood by one of ordinary skill in the art described in the disclosure. Among the terms used in the disclosure, terms defined in a general dictionary may be interpreted with the same or similar meaning as the meaning in the context of the related art, and unless explicitly defined in the disclosure, it is not to be construed in an ideal or overly formal sense. In some cases, even terms defined in the disclosure cannot be construed to exclude embodiments of the disclosure.

In various embodiments of the disclosure described below, a hardware approach method will be described as an example. However, because various embodiments of the disclosure include technology using both hardware and software, various embodiments of the disclosure do not exclude a software-based approach. Further, although various embodiments of the disclosure describe a wireless communication system as an example, use in a wired communication system is not excluded.

Hereinafter, the disclosure relates to an apparatus and method for transmitting and receiving data and control information in a wireless communication system. Specifically, the disclosure describes a technique that a base station indicates information on a set of assumed bands to a UE according to capability information of the UE and that the UE uses configuration information from the base station to calculate transmission/reception parameters.

In the following description, a term referring to a signal, a term referring to a channel, a term referring to control information, a term referring to network entities, and a term referring to components of an apparatus are exemplified for convenience of description. Accordingly, the disclosure is not limited to the terms described below, and other terms having equivalent technical meanings may be used. For example, in the disclosure, a peak data rate and a max data rate may be used interchangeably.

In the following description, a physical channel and a signal may be used interchangeably with data or a control signal. For example, although a physical downlink shared channel (PDSCH) is a term referring to a physical channel through which data is transmitted, the PDSCH may also be used for referring to data.

Hereinafter, in the disclosure, higher signaling refers to a method of transmitting a signal from a base station to a UE using a downlink data channel of a physical layer or from a UE to a base station using an uplink data channel of a physical layer. The higher signaling may be understood as radio resource control (RRC) signaling or a medium access control (MAC) control element (CE).

Further, in the disclosure, in order to determine whether a specific condition is satisfied or fulfilled, an expression of more than or less than has been used, but this is only a description for expressing an example, and does not exclude a description of a specific number or more or a specific number or lower. A condition described as a 'specific number or more' may be replaced with 'more than a specific number', a condition described as a 'specific number or lower' may be replaced with 'less than a specific number', and a condition described as a 'specific number or more and less than a specific number' may be replaced with 'more than a specific number and a specific number or lower'.

Further, although the disclosure describes various embodiments using terms used in some communication standards (e.g., 3rd generation partnership project (3GPP)), this is only an example for description. Various embodiments of the disclosure may be easily modified and applied in other communication systems.

FIG. 1 illustrates a wireless communication system according to an embodiment of the disclosure.

FIG. 1 illustrates a base station 110, a UE 120, and a UE 130 as some of nodes using a wireless channel in a wireless communication system. Although FIG. 1 illustrates only one base station, other base stations that are the same as or similar to the base station 110 may be further included.

Referring to FIG. 1, the base station 110 is a network infrastructure that provides wireless access to the UEs 120 and 130. The base station 110 has coverage defined as a predetermined geographic area based on a distance capable of transmitting a signal. In addition to the base station, the base station 110 may be referred to as an 'access point (AP)', 'eNodeB (eNB)', '5th generation node (5G node)', 'next generation nodeB (gNB)', 'wireless point', 'transmission/reception point (TRP)', or any other term having an equivalent technical meaning.

Each of the UEs 120 and 130 is a device used by a user and performs communication with the base station 110 through a wireless channel. A link from the base station 110 to the UE 120 or 130 is referred to as a downlink (DL), and a link from the UE 120 or 130 to the base station 110 is referred to as an uplink (UL). In some cases, at least one of the UEs 120 and 130 may be operated without the user's involvement. That is, at least one of the UEs 120 and 130 is a device that performs machine type communication (MTC), and may not be carried by the user. Each of the UEs 120 and 130 may be referred to as a 'terminal', 'user equipment (UE)', 'mobile station', 'subscriber station', 'remote terminal', 'wireless terminal', 'user device', or any other term having an equivalent technical meaning.

The base station 110, the UE 120, and the UE 130 may transmit and receive radio signals in mmWave bands (e.g., 28 GHz, 30 GHz, 38 GHz, and 60 GHz). In this case, in order to improve a channel gain, the base station 110, the UE 120, and the UE 130 may perform beamforming. Beamforming may include transmission beamforming and reception beamforming. That is, the base station 110, the UE 120, and the UE 130 may impart directivity to a transmission signal or a reception signal. To this end, the base station 110 and the UEs 120 and 130 may select serving beams 112, 113, 121, and 131 through a beam search or beam management procedure. After the serving beams 112, 113, 121, and 131 are selected, subsequent communication may be performed through a resource in a quasi-co-located (QCL) relationship with a resource that has transmitted the serving beams 112, 113, 121, and 131.

If large-scale characteristics of a channel that has transmitted a symbol on a first antenna port may be inferred from a channel that has transmitted a symbol on a second antenna port, the first antenna port and the second antenna port may be evaluated to be in a QCL relationship. For example, the large-scale characteristics may include at least one of delay spread, Doppler spread, Doppler shift, average gain, average delay, or spatial receiver parameter.

Figure 2:
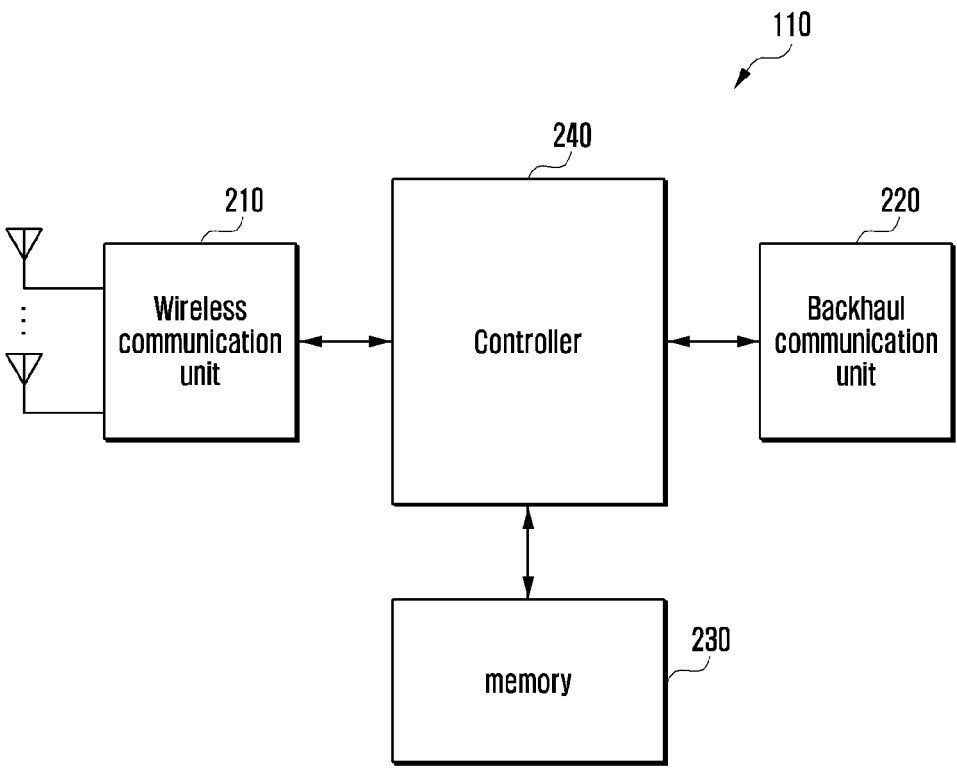
FIG. 2 illustrates a configuration of a base station in a wireless communication system according to an embodiment of the disclosure.

FIG. 2 illustrates a configuration of a base station in a wireless communication system according to an embodiment of the disclosure.

The configuration illustrated in FIG. 2 may be understood as a configuration of the base station 110. Terms such as ' . . . unit', ' . . . er', etc. used hereinafter refer to a unit that processes at least one function or operation, and this may be implemented with hardware, software, or a combination of hardware and software.

Referring to FIG. 2, the base station includes a wireless communication unit 210, a backhaul communication unit 220, a memory 230, and a controller 240.

The wireless communication unit 210 performs functions for transmitting and receiving signals through a wireless channel. For example, the wireless communication unit 210 performs a function of conversion between a baseband signal and a bit string in accordance with a physical layer standard of a system. For example, when transmitting data, the wireless communication unit 210 encodes and modulates a transmission bit string and thereby generates complex symbols. Also, when receiving data, the wireless communication unit 210 restores a reception bit string through demodulation and decoding of a baseband signal.

In addition, the wireless communication unit 210 up-converts a baseband signal into a radio frequency (RF) band signal, transmits the RF band signal through an antenna, and down-converts an RF band signal received through the antenna into a baseband signal. To this end, the wireless communication unit 210 may include a transmission filter, a reception filter, an amplifier, a mixer, an oscillator, a digital to analog converter (DAC), an analog to digital converter (ADC), and the like. Further, the wireless communication unit 210 may include a plurality of transmission and reception paths. Also, the wireless communication unit 210 may include at least one antenna array configured with a plurality of antenna elements.

In terms of hardware, the wireless communication unit 210 may be configured with a digital unit and an analog unit, and the analog unit may be configured with a plurality of sub-units according to operating power, operating frequency, and the like. The digital unit may be implemented with at least one processor (e.g., digital signal processor (DSP)).

The wireless communication unit 210 transmits and receives signals as described above. Accordingly, all or part of the wireless communication unit 210 may be referred to as a 'transmitter', 'receiver', or 'transceiver'. Further, in the following description, transmission and reception performed through a wireless channel are used in the meaning including the processing being performed as described above by the wireless communication unit 210.

The backhaul communication unit 220 provides an interface for performing communication with other nodes in the network. That is, the backhaul communication unit 220 converts a bit string transmitted from the base station to another node, for example, another access node, another base station, an upper node, the core network, and the like into a physical signal, and converts a physical signal received from any other node to a bit string.

The memory 230 stores a default program for the operation of the base station, an application program, and data such as configuration information. The memory 230 may be configured with a volatile memory, a non-volatile memory, or a combination thereof. Further, the memory 230 provides the stored data in response to the request of the controller 240.

The controller 240 controls overall operations of the base station. For example, the controller 240 transmits and receives a signal through the wireless communication unit 210 or the backhaul communication unit 220. In addition, the controller 240 writes and reads data in the memory 230. Further, the controller 240 may perform functions of a protocol stack required in the communication standard. According to another implementation example, the protocol stack may be included in the wireless communication unit 210. To this end, the controller 240 may include at least one processor. According to various embodiments, the controller 240 may control the base station to perform operations according to various embodiments to be described later.

Figure 3:
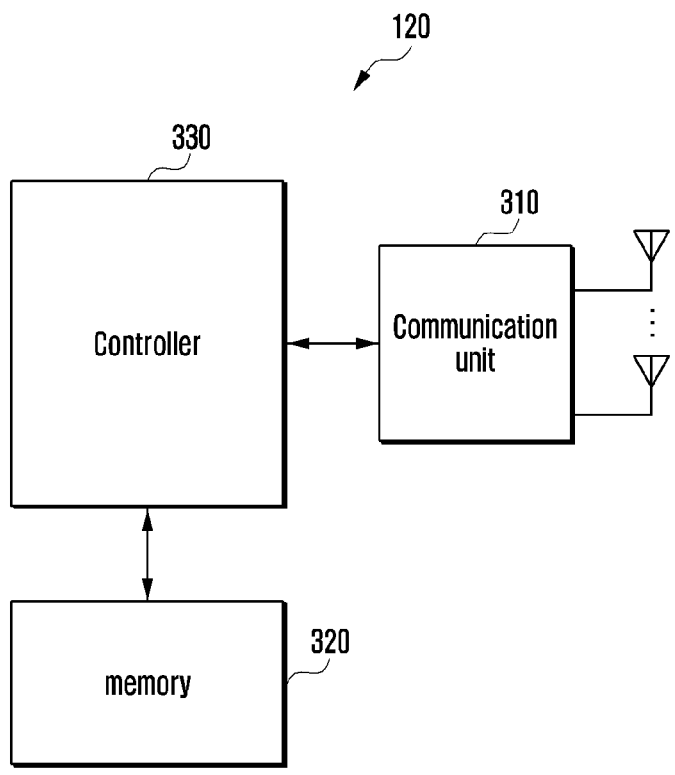
FIG. 3 illustrates a configuration of a user equipment (UE) in a wireless communication system according to an embodiment of the disclosure.

FIG. 3 illustrates a configuration of a UE in a wireless communication system according to an embodiment of the disclosure.

The configuration illustrated in FIG. 3 may be understood as a configuration of the UE 120. Terms such as ' . . . unit', ' . . . er', etc. used hereinafter refer to a unit that processes at least one function or operation, and this may be implemented into hardware or software, or a combination of hardware and software.

Referring to FIG. 3, the UE includes a communication unit 310, a memory 320, and a controller 330.

The communication unit 310 performs functions for transmitting and receiving signals through a wireless channel. For example, the communication unit 310 may perform a function of conversion between a baseband signal and a bit string in accordance with a physical layer standard of a system. For example, when transmitting data, the communication unit 310 encodes and modulates a transmission bit string and thereby generates complex symbols. Also, when receiving data, the communication unit 310 restores a reception bit string through demodulation and decoding of a baseband signal. Further, the communication unit 310 up-converts a baseband signal into an RF band signal, transmits the RF band signal through an antenna, and down-converts an RF band signal received through the antenna into a baseband signal. For example, the communication unit 310 may include a transmission filter, a reception filter, an amplifier, a mixer, an oscillator, a DAC, an ADC, and the like.

Further, the communication unit 310 may include a plurality of transmission and reception paths. Also, the communication unit 310 may include at least one antenna array configured with a plurality of antenna elements. In terms of hardware, the communication unit 310 may be configured with a digital circuit and an analog circuit (e.g., radio frequency integrated circuit (RFIC)). The digital circuit and the analog circuit may be implemented into one package. In addition, the communication unit 310 may include a plurality of RF chains. Also, the communication unit 310 may perform beamforming.

The communication unit 310 transmits and receives signals as described above. Accordingly, all or part of the communication unit 310 may be referred to as a 'transmitter', 'receiver', or 'transceiver'. Further, in the following description, transmission and reception performed through a wireless channel are used in the meaning including the processing being performed as described above by the communication unit 310.

The memory 320 stores a default program for the operation of the UE, an application program, and data such as configuration information. The memory 320 may be configured with a volatile memory, a non-volatile memory, or a combination thereof. Further, the memory 320 provides the stored data in response to the request of the controller 330.

The controller 330 controls overall operations of the UE. For example, the controller 330 transmits and receives a signal through the communication unit 310. In addition, the controller 330 writes and reads data in the memory 320. Further, the controller 330 may perform functions of a protocol stack required in the communication standard. To this end, the controller 330 may include at least one processor or microprocessor or may be a part of the processor. Further, a part of the communication unit 310 and the controller 330 may be referred to as a communication processor (CP). According to various embodiments, the controller 330 may control the UE to perform operations according to various embodiments to be described later.

Figure 4:
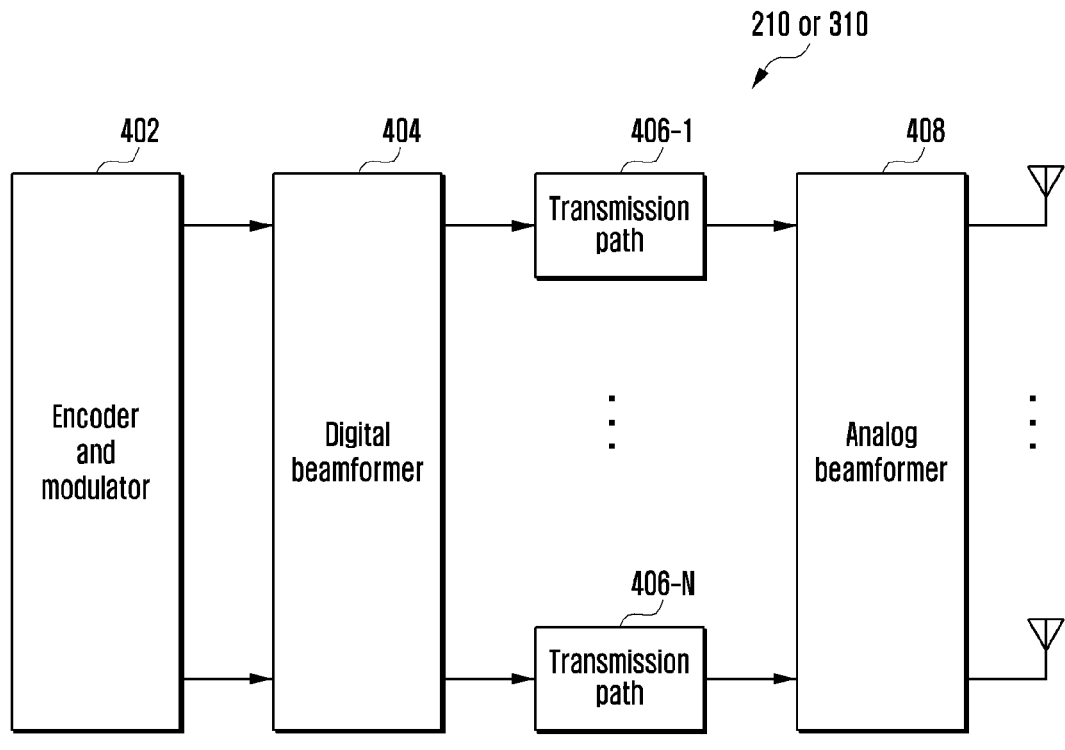
FIG. 4 illustrates a configuration of a communication unit in a wireless communication system according to embodiment of the disclosure.

FIG. 4 illustrates a configuration of a communication unit in a wireless communication system according to an embodiment of the disclosure.

FIG. 4 illustrates an example of a detailed configuration of the wireless communication unit 210 of FIG. 2 or the communication unit 310 of FIG. 3. Specifically, FIG. 4 illustrates components for performing beamforming as a part of the wireless communication unit 210 of FIG. 2 or the communication unit 310 of FIG. 3.

Referring to FIG. 4, the wireless communication unit 210 or the communication unit 310 includes an encoder and modulator 402, a digital beamformer 404, a plurality of transmission paths 406-1 to 406-N, and an analog beamformer 408.

The encoder and modulator 402 performs channel encoding. For channel encoding, at least one of a low density parity check (LDPC) code, a convolution code, or a polar code may be used. The encoder and modulator 402 may perform constellation mapping and thereby generate modulation symbols.

The digital beamformer 404 performs beamforming on a digital signal (e.g., modulation symbols). To this end, the digital beamformer 404 multiplies modulation symbols by beamforming weights. The beamforming weights are used for changing the magnitude and phase of a signal, and may be referred to as a 'precoding matrix', a 'precoder', or the like. The digital beamformer 404 outputs digital-beamformed modulation symbols to a plurality of transmission paths 406-1 to 406-N. In this case, according to a multiple input multiple output (MIMO) transmission technique, modulation symbols may be multiplexed or the same modulation symbols may be provided to the plurality of transmission paths 406-1 to 406-N.

The plurality of transmission paths 406-1 to 406-N convert digital-beamformed digital signals into analog signals. To this end, each of the plurality of transmission paths 406-1 to 406-N may include an inverse fast Fourier transform (IFFT) operation unit, a cyclic prefix (CP) insertion unit, a DAC, and an up-conversion unit. The CP insertion unit is for an orthogonal frequency division multiplexing (OFDM) scheme, and may be excluded in case that any other physical layer scheme (e.g., filter bank multi-carrier (FBMC)) is applied. That is, the plurality of transmission paths 406-1 to 406-N may provide independent signal processing processes for a plurality of streams generated through digital beamforming. However, depending on implementation types, some of components of the plurality of transmission paths 406-1 to 406-N may be used in common.

The analog beamformer 408 may perform beamforming on an analog signal. To this end, the digital beamformer 404 may multiply the analog signals by beamforming weights. The beamforming weights are used for changing the magnitude and phase of the signal. Specifically, the analog beamformer 408 may be variously configured depending on a connection structure between the plurality of transmission paths 406-1 to 406-N and antennas. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array or connected to two or more antenna arrays.

The communication system is evolving from providing a traditional voice-oriented service to a broadband wireless communication system that provides high-speed and high-quality packet data services as in communication standards such as high speed packet access (HSPA), long term evolution (LTE) (or evolved universal terrestrial radio access (E-UTRA)), or long term evolution advanced (LTE-A) of 3GPP, high rate packet data (HRPD), or ultra-mobile broadband (UMB) of 3GPP2, and 802.16e of IEEE. In addition, as a 5G wireless communication system, a communication standard of 5G or new radio (NR) is being made.

The NR system employs an orthogonal frequency division multiplexing (OFDM) scheme in a downlink (DL) and an uplink (UL). Specifically, a cyclic-prefix OFDM (CP-OFDM) scheme is employed in the downlink, and a discrete Fourier transform spreading OFDM (DFT-S-OFDM) scheme is employed along with CP-OFDM in the uplink. The uplink refers to a radio link through which the UE transmits data or control signals to the base station, and the downlink refers to a radio link through which the base station transmits data or control signals to the UE. The multiple access scheme can distinguish data or control information of each user by allocating and operating time-frequency resources for carrying data or control information for respective users so as not to overlap with each other, that is, so that orthogonality is established.

The NR system employs a hybrid automatic repeat request (HARQ) scheme of retransmitting corresponding data in the physical layer in case that a decoding failure occurs in initial transmission. According to the HARQ scheme, in case that the receiver fails to accurately decode data, the receiver transmits a negative acknowledgment (NACK), which is information indicating a decoding failure, to the transmitter, so that the transmitter may retransmit the corresponding data in the physical layer. By combining data retransmitted by the transmitter with data that has previously failed to decode, the receiver may improve a data reception performance. Also, in case that the receiver accurately decodes data, by transmitting an acknowledgment (ACK), which is information a decoding success, to the transmitter, so that the transmitter can transmit new data.

Figure 5:
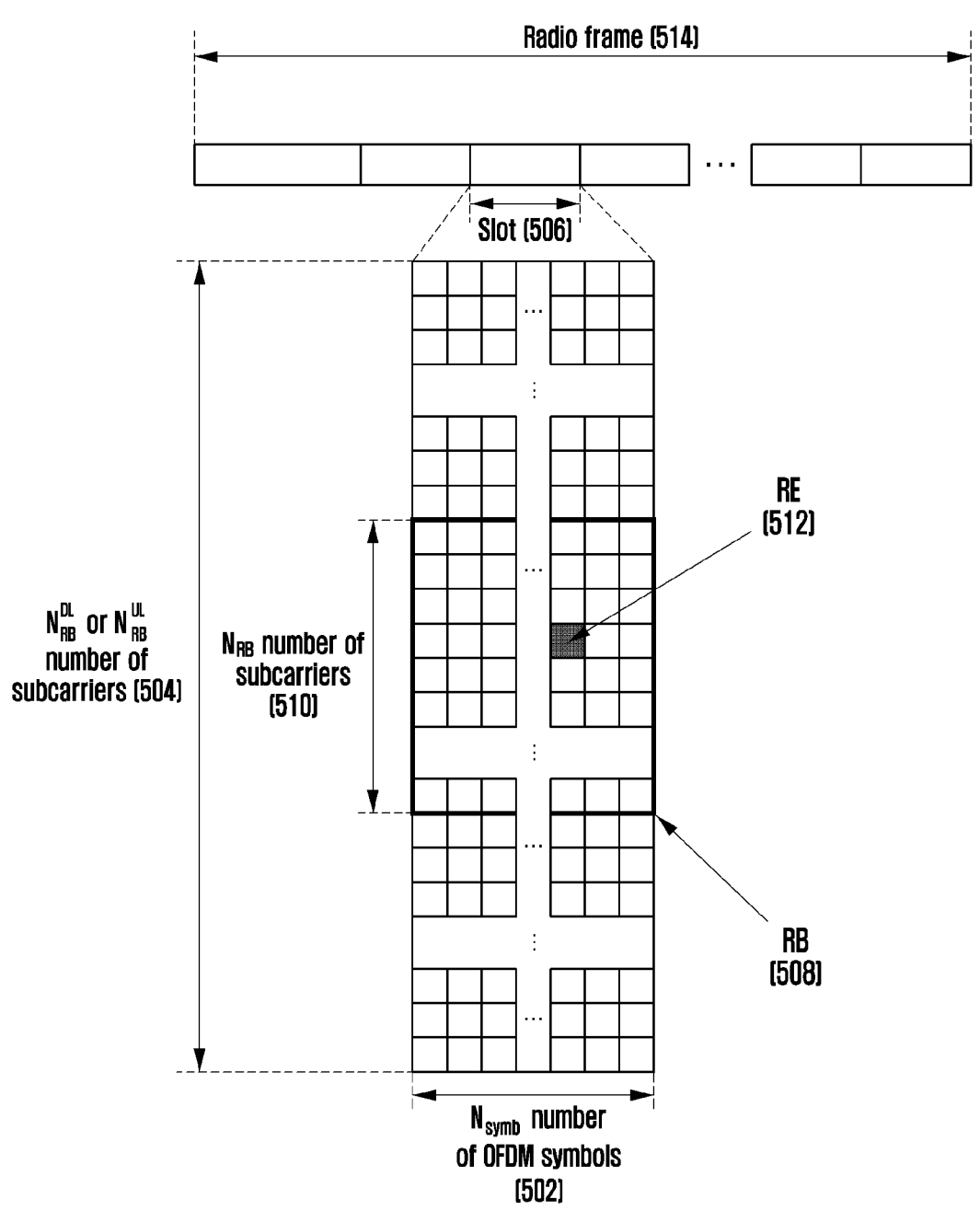
FIG. 5 illustrates a resource structure in a time-frequency domain in a wireless communication system according to an embodiment of the disclosure.

FIG. 5 illustrates a resource structure in a time-frequency domain in a wireless communication system according to an embodiment of the disclosure.

FIG. 5 illustrates a basic structure of a time-frequency domain, which is a radio resource domain in which data or a control channel is transmitted in downlink or uplink.

Referring to FIG. 5, a horizontal axis represents a time domain, and a vertical axis represents a frequency domain. The minimum transmission unit in the time domain is an OFDM symbol, and Nsymb number of OFDM symbols 502 constitute one slot 506. The length of a subframe is defined as 1.0 ms, and the length of a radio frame 514 is defined as 10 ms. The minimum transmission unit in the frequency domain is a subcarrier, and a bandwidth of the entire system transmission band is composed of NBW number of subcarriers 504.

A basic unit of a resource in the time-frequency domain is a resource element (RE) 512, which may be represented by an OFDM symbol index and a subcarrier index. A resource block (RB, or physical resource block (PRB)) 508 is defined as Nsymb number of consecutive OFDM symbols 502 in the time domain and NRB number of consecutive subcarriers 510 in the frequency domain. Accordingly, one RB 508 includes Nsymb×NRB number of REs 512. In general, the minimum transmission unit of data is an RB. In the NR system, generally, Nsymb is 14, NRB is 12, and NBW and NRB may be proportional to the bandwidth of the system transmission band. A data rate may increase in proportion to the number of RBs scheduled to the UE. In the NR system, in case of a frequency division duplex (FDD) system that divides and operates a downlink and uplink by frequencies, a downlink transmission bandwidth and an uplink transmission bandwidth may be different from each other. The channel bandwidth denotes a radio frequency (RF) bandwidth corresponding to the system transmission bandwidth. Table 1 and Table 2 represent a part of the corresponding relationship among a system transmission bandwidth, subcarrier spacing (SCS), and a channel bandwidth, defined in the NR system in frequency bands lower than 6 GHz and higher than 6 GHz. For example, the transmission bandwidth of the NR system having a 100 MHz channel bandwidth with 30 kHz subcarrier spacing is composed of 273 RBs. In Table 1 and Table 2, N/A may be a bandwidth-subcarrier combination not supported by the NR system.

TABLE 1

| | | Channel bandwidth [MHz] | | | | | |
|---|---|---|---|---|---|---|---|
| | SCS | 5 | 10 | 20 | 50 | 80 | 100 |
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| | | Channel bandwidth [MHz] | | | |
|---|---|---|---|---|---|
| | SCS | 50 | 100 | 200 | 400 |
| Transmission bandwidth configuration $N_{RB}$ | 60 kHz | 66 | 132 | 264 | N/A |
| | 120 kHz | 32 | 66 | 132 | 264 |

In the NR system, scheduling information on downlink data or uplink data is transmitted from the base station to the UE through downlink control information (DCI). The DCI is defined in various formats, and depending on each format, whether it is an uplink grant which is scheduling information on uplink data or a downlink grant which is scheduling information on downlink data, whether it is compact DCI in which the size of control information is small, whether spatial multiplexing using multiple antennas is applied, whether it is DCI for power control, and the like may be determined. For example, DCI format 1-1, which is scheduling control information on downlink data, may include at least one of items shown in Table 3 below.

TABLE 3

| Item | Contents |
|---|---|
| Carrier indicator | This indicates a frequency carrier where transmission is performed. |
| DCI format indicator | This is an indicator for distinguishing whether the corresponding DCI is for downlink or uplink. |
| Bandwidth part (BWP) indicator | This indicates a BWP where transmission is performed. |
| Frequency domain resource allocation | This indicates an RB in the frequency domain allocated for data transmission. A resource to be expressed is determined according to the system bandwidth and the resource allocation scheme. |
| Time domain resource allocation | This indicates an OFDM symbol and a slot to be used for transmission of a data-related channel. |
| VRB-to-PRB mapping | This indicates a mapping scheme between a virtual RB (VRB) index and a physical RB (PRB) index. |
| Modulation and coding scheme (MCS) | This indicates a modulation scheme and a coding rate used for data transmission. That is, this may indicate information about quadrature phase shift keying (QPSK), 16 quadrature amplitude modulation (16QAM), 64QAM, or 256QAM, and a coding rate value that informs a transport block size (TBS) and channel coding information. |
| Code block group (CBG) transmission information | This indicates information about a CBG transmitted when CBG retransmission is configured. |
| HARQ process number | This indicates the process number of HARQ. |
| New data indicator (NDI) | This indicates whether HARQ initial transmission or retransmission. |
| Redundancy version (RV) | This indicates a redundancy version of HARQ. |
| Transmit power control command (TPC) for physical uplink control channel (PUCCH) | This indicates a transmit power control command for PUCCH which is an uplink control channel. |

In Table 3, in case of PDSCH transmission, time domain resource assignment may be represented by information on a slot in which the PDSCH is transmitted, a start symbol position S in the slot, and the number L of symbols to which the PDSCH is mapped. S may be a relative position from the start of the slot, L may be the number of consecutive symbols, and S and L may be determined from start and length indicator values (SLIV) defined as in Table 4.

TABLE 4 if (L−1)≤7 then
   SLIV=14·(L−1)+S
else
   SLIV=14·(14−L+11)+(14−1−S)
where 0<L≤14−S In the NR system, through RRC configuration in general, information on the corresponding relation among the SLIV value, the PDSCH or physical uplink shared channel (PUSCH) mapping type, and information on the slot in which the PDSCH or PUSCH is transmitted may be configured in one row. Thereafter, by indicating an index value defined in the configured corresponding relation using time domain resource allocation of DCI, the base station may transfer, to the UE, the SLIV value, the PDSCH or PUSCH mapping type, and information on the slot in which the PDSCH or PUSCH is transmitted.

In case of the NR system, the PDSCH or PUSCH mapping type is defined as a type A and a type B. In case of the PDSCH or PUSCH mapping type A, a demodulation reference signal (DMRS) symbol starts from the second or third OFDM symbol in the slot. In case of the PDSCH or PUSCH mapping type B, the DMRS symbol starts from the first OFDM symbol of a time domain resource allocated for PUSCH transmission.

Table 5 and Table 6 illustrate combinations of S and L supported for each type of the PDSCH and the PUSCH.

TABLE 5

| PDSCH | Normal cyclic prefix | | | Extended cyclic prefix | | |
|---|---|---|---|---|---|---|
| mapping type | S | L | S + L | S | L | S + L |
| Type A | $\{0, 1, 2, 3\}$ (Note 1) | $\{3, \ldots, 14\}$ | $\{3, \ldots, 14\}$ | $\{0, 1, 2, 3\}$ (Note 1) | $\{3, \ldots, 12\}$ | $\{3, \ldots, 12\}$ |
| Type B | $\{0, \ldots, 12\}$ | $\{2, 4, 7\}$ | $\{2, \ldots, 14\}$ | $\{0, \ldots, 10\}$ | $\{2, 4, 6\}$ | $\{2, \ldots, 12\}$ |

(Note 1):

S = 3 is applicable only if dmrs-TypeA-Posiition = 3

TABLE 6

| PUSCH | Normal cyclic prefix | | | Extended cyclic prefix | | |
|---|---|---|---|---|---|---|
| mapping type | S | L | S + L | S | L | S + L |
| Type A | 0 | $\{4, \ldots, 14\}$ | $\{4, \ldots, 14\}$ | 0 | $\{4, \ldots, 12\}$ | $\{4, \ldots, 12\}$ |
| Type B | $\{0, \ldots, 13\}$ | $\{1, \ldots, 14\}$ | $\{1, \ldots, 14\}$ | $\{0, \ldots, 12\}$ | $\{1, \ldots, 12\}$ | $\{1, \ldots, 12\}$ |

The DCI may be transmitted in a physical downlink control channel (PDCCH), which is a downlink control channel, through channel coding and modulation. The PDCCH may be used for referring to control information itself rather than a channel. In general, the DCI is independently scrambled with a specific radio network temporary identifier (RNTI) or UE identifier for each UE, is configured with an independent PDCCH after addition of a cyclic redundancy check (CRC) and channel coding, and is transmitted. The PDCCH is mapped to a control resource set (CORESET) configured to the UE.

Downlink data may be transmitted in a PDSCH, which is a physical channel for downlink data transmission. The PDSCH may be transmitted after a control channel transmission interval, and scheduling information such as a specific mapping position and a modulation scheme in the frequency domain is indicated by the DCI transmitted through the PDCCH. Through the MCS among control information constituting the DCI, the base station notifies the UE of a modulation scheme applied to the PDSCH to be transmitted and a size of data (e.g., transport block size (TBS)) to be transmitted. In an embodiment, the MCS may be configured with 5 bits or more or fewer bits. The TBS corresponds to a size before channel coding for error correction is applied to a transport block (TB), which is data in which the base station wants to transmit.

In the disclosure, a transport block (TB) may include a medium access control (MAC) header, a MAC control element (CE), one or more MAC service data unit (SDU), and padding bits. Alternatively, the TB may indicate a data unit or MAC protocol data unit (PDU) sent down from the MAC layer to the physical layer.

The modulation schemes supported in the NR system are quadrature phase shift keying (QPSK), 16 quadrature amplitude modulation (QAM), 64 QAM, and 256 QAM, and each modulation order (Qm) may be 2, 4, 6, or 8. That is, 2 bits per symbol for QPSK, 4 bits per symbol for 16 QAM, 6 bits per symbol for 64 QAM, and 8 bits per symbol for 256 QAM may be transmitted.

In terms of services, the NR system is designed to allow various services to be multiplexed freely in time and frequency resources, and accordingly, waveform/numerology, reference signals, and the like may be adjusted freely or dynamically, as needed. In order to provide an optimal service to the UE in wireless communication, optimized data transmission through measurement of a channel quality and interference amount is important, and thus accurate channel state measurement is essential. However, unlike 4G communication in which the channel and interference characteristics do not change significantly depending on frequency resources, in case of 5G channels, channel and interference characteristics change greatly depending on services, and thus it is necessary to support a subset of the frequency resource group (FRG) dimension that can measure separately the channel and interference characteristics.

Figure 6A:
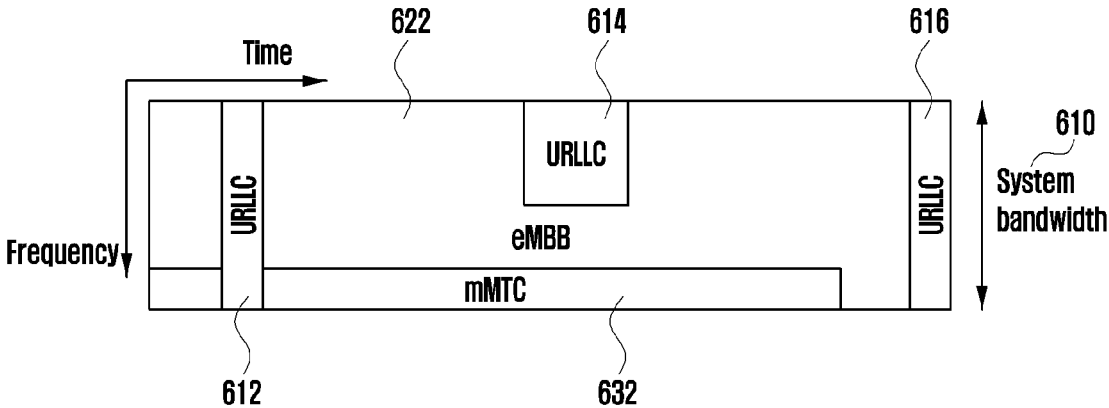
FIG. 6A illustrates an example of allocating data for each service to a frequency-time resource in a wireless communication system according to an embodiment of the disclosure.
Figure 6B:
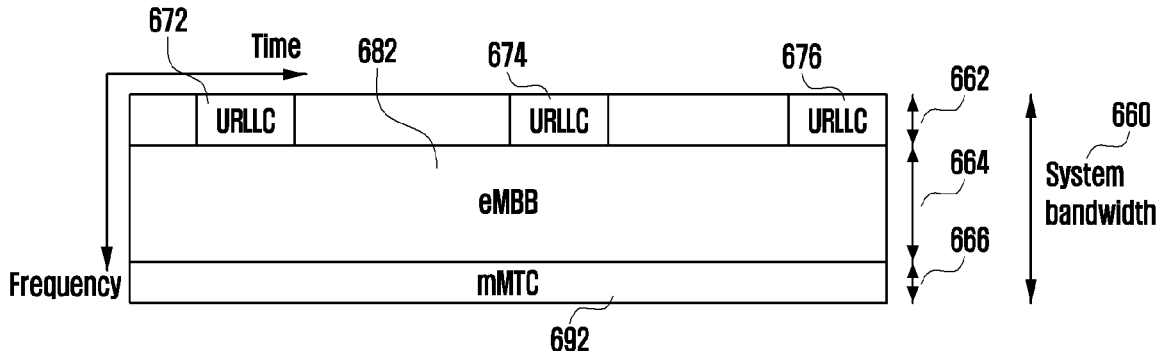
FIG. 6B illustrates another example of allocating data for each service to a frequency-time resource in a wireless communication system according to an embodiments of the disclosure.

Meanwhile, the NR system may divide types of supported services into enhanced mobile broadband (eMBB), massive machine type communications (mMTC), and ultra-reliable and low-latency communications (URLLC). The eMBB is a service that aims at high-speed transmission of high-capacity data, the mMTC is a service that aims at UE power minimization and access of multiple UEs, and the URLLC is a service that aims at high reliability and low latency. Different requirements may be applied depending on the type of service applied to the UE. Examples of resource distribution of each service are illustrated in FIGS. 6A and 6B. Hereinafter, with reference to FIGS. 6A and 6B, schemes in which frequency and time resources are allocated for information transmission in each system are shown.

FIG. 6A illustrates an example of allocating data for each service to a frequency-time resource in a wireless communication system according to an embodiment of the disclosure.

Referring to FIG. 6A, resources may be allocated for eMBB 622, URLLC 612, 614, 616, and mMTC 632 in the entire system frequency band 610. In case that data of URLLC 612, 614, 616 is generated while data of eMBB 622 and data of mMTC 632 are allocated and transmitted in a specific frequency band, the data of URLLC 612, 614, 616 may be transmitted without emptying a part already allocated for the eMBB 622 and mMTC 632 or transmitting the data for the eMBB 622 and mMTC 632. Because the URLLC requires a reduction in delay time, a resource for transmitting the data of URLLC 612, 614, 616 may be allocated to a part of the resource allocated to the eMBB 622. In case that the URLLC 612, 614, 616 is additionally allocated and transmitted in the resource to which the eMBB 622 is allocated, the data of eMBB 622 may not be transmitted in the overlapping frequency-time resource, and thus a transmission performance of the data of eMBB 622 may be lowered. That is, in the above case, a transmission failure of the eMBB 622 data may occur due to allocation of resources for the URLLC 612, 614, 616. The scheme illustrated in FIG. 6A may be referred to as a preemption scheme.

FIG. 6B illustrates another example of allocating data for each service to a frequency-time resource in a wireless communication system according to an embodiment of the disclosure.

FIG. 6B illustrates an example in which each service is provided in each of sub-bands 662, 664, and 666 divided from the entire system frequency band 660. Specifically, the sub-band 662 may be used for data transmission of URLLC 672, 674, 576, the sub-band 664 may be used for data transmission of eMBB 682, and the sub-band 666 may be used for data transmission of mMTC 692. Information related to a configuration of the sub-bands 662, 664, and 666 may be predetermined, and the information may be transmitted from the base station to the UE through higher signaling. Alternatively, the base station or a network node may arbitrarily divide the sub-bands 662, 664, and 666 and provide services without separately transmitting the sub-band configuration information to the UE.

According to various embodiments, a length of a transmission time interval (TTI) used for URLLC transmission may be shorter than that of a TTI used for eMBB or mMTC transmission. In addition, a response of URLLC-related information may be transmitted faster than eMBB or mMTC, and thus the UE using the URLLC service can transmit and receive information with low delay. Structures of a physical layer channel used for respective types so as to transmit the above services or data may be different from each other. For example, at least one of a length of a TTI, an allocation unit of a frequency resource, a structure of a control channel, and a data mapping method may be different.

Although the three services and three data types have been described above, more kinds of services and corresponding data types may exist. Even in this case, various embodiments to be described later may be implemented.

Figure 7:
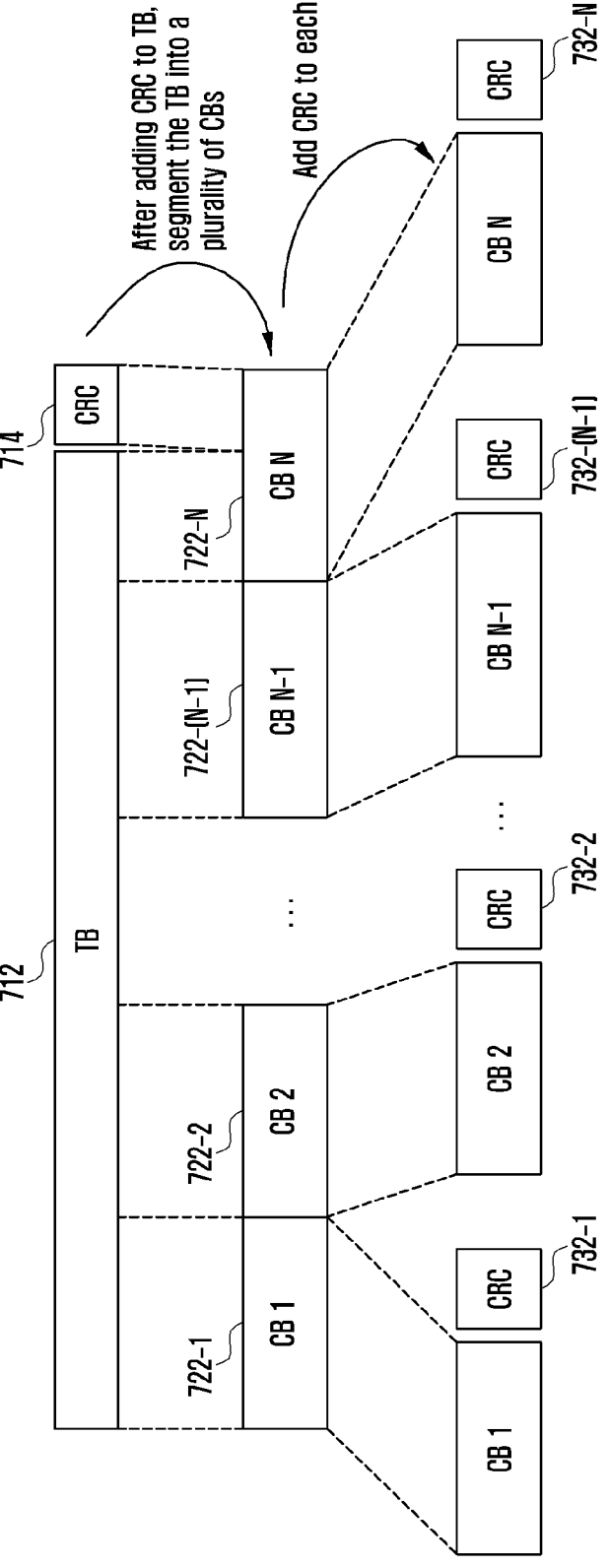
FIG. 7 illustrates a data encoding scheme in a wireless communication system according to an embodiment of the disclosure.

FIG. 7 illustrates a data encoding method in a wireless communication system according to an embodiment of the disclosure.

FIG. 7 illustrates that one TB is segmented into several code blocks (CBs) and a CRC is added.

Referring to FIG. 7, a CRC 714 may be added to the rear end or front end of one TB 712 to be transmitted in uplink or downlink. The CRC 714 may have 16 bits, 24 bits, a pre-fixed number of bits, or a variable number of bits depending on a channel condition, and may be used to determine whether or not channel coding is successful.

The TB 712 and an added block of the CRC 714 may be segmented into a plurality of CBs 722-1, 722-2, 722-(N−1), and 722-N. The TB and the CRC-added block may be segmented with a predefined size of CB, and in this case, all the CBs may have the same size, or the last CB 722-N may be smaller in size than the other CBs or may be configured to have the same length as that of other CBs by adding 0, a random value, or 1. (For example, in case of the 5G NR system conforming to 3GPP TS 38.212 and 38.214, the TB may be segmented into CBs of the same size, and each CB may include the same number of added bits.) CRCs 732-1, 732-2, 732-(N−1), and 732-N may be added to the segmented CBs, respectively. The CRCs 732-1, 732-2, 732-(N−1), and 732-N may have 16 bits, 24 bits, or a pre-fixed number of bits, and be used for determining the success or failure of channel coding at the receiver.

The TB 712 and a cyclic generator polynomial may be used for generating the CRC 714. The cyclic generator polynomial may be defined in various ways. For example, assuming that the cyclic generator polynomial for 24-bit CRC is $gCRC24A(D)=D24+D23+D18+D17+D14+D11+D10+D7+D6+D5+D4+D3+D+1$, and that L is 24, the CRC $p1, p2, \ldots, pL-1$ for TB data $a0, a1, a2, a3, \ldots, aA-1$ may be determined as a value that when dividing $a0DA+23+a1DA+22+ \ldots aA-1D24+p0D23+p1D22+p22D1+p23$ by $gCRC24A(D)$, the remainder becomes zero. Although a case that the CRC length L is 24 has been described above, the CRC length L may be determined to have various lengths such as 12, 16, 24, 32, 40, 48, 64, and the like.

However, according to another embodiment, the CRC 714 added to the TB and the CRCs 732-1, 732-2, 732-(N−1), and 732-N added to the CBs 722-1, 722-2, 722-(N−1), and 722-N may be omitted depending on the type of channel code to be applied to the CB. For example, when a low density parity code (LDPC), not a turbo code, is applied to the CB, the CRCs 732-1, 732-2, 732-(N−1), and 732-N to be added for the respective CBs may be omitted. However, even when the LDPC is applied, the CRCs 732-1, 732-2, 732-(N−1), and 732-N may be added to the CBs 722-1, 722-2, 722-(N−1), and 722-N. Also, even when a polar code is used, such a CRC may be added or omitted.

Referring to FIG. 7, the maximum length of one CB is determined according to the type of channel coding applied to the TB, and the TB and the CRC added to the TB are segmented into CBs based on the maximum length of the CB. In the LTE system, a CRC for the CB is added to the segmented CB, data bits of the CB and the CRC are encoded with a channel code, thereby coded bits are determined, and as promised in advance, the number of bits for rate matching is determined for the respective coded bits.

Figure 8:
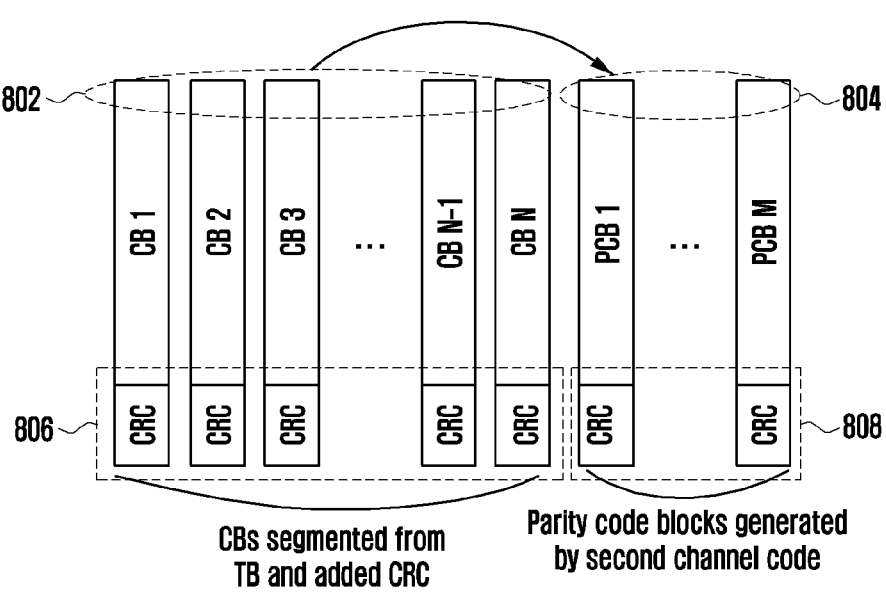
FIG. 8 illustrates a usage example of an outer code in a wireless communication system according to an embodiment of the disclosure.

FIG. 8 illustrates an example of using an outer code in a wireless communication system according to an embodiment of the disclosure.

Referring to FIG. 8, after one TB is segmented into a plurality of code blocks (CBs), bits or symbols 802 at the same position in each CB are encoded using a second channel code. Accordingly, parity bits or symbols 804 are generated. Thereafter, CRCs 806 and 808 may be added to the CBs and parity CBs generated by second channel code encoding.

Whether to add the CRCs 806 and 808 may vary depending on the type of a channel code. For example, in case that a turbo code is used as the first channel code, the CRCs 806 and 808 may be added. In the disclosure, as the first channel code, a convolutional code, an LDPC code, a turbo code, a polar code, and the like may be used. However, this is only an example, and various channel codes may be applied to the disclosure as the first channel code. In the disclosure, as the second channel code, a reed-Solomon code, a BCH code, a Raptor code, a parity bit generation code, and the like may be used for example. However, this is only an example, and various channel codes may be used as the second channel code.

Figure 9A:
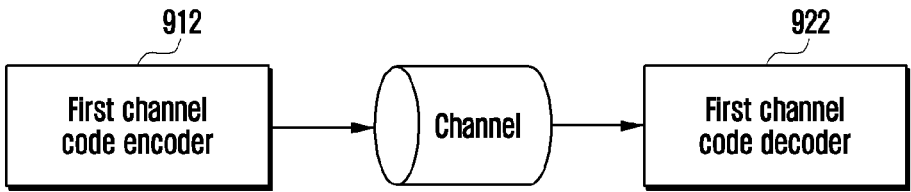
FIGS. 9A and 9B illustrate configurations of a transmitter and a receiver using an outer code in a wireless communication system according to various embodiments of the disclosure.
Figure 9B:
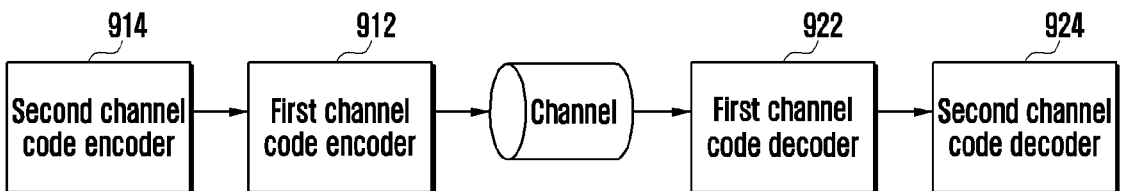

FIGS. 9A and 9B illustrate configurations of a transmitter and a receiver using an outer code in a wireless communication system according to various embodiments of the disclosure.

Referring to FIG. 9A, in case that the outer code is not used, a first channel code encoder 912 and a first channel code decoder 922 are included in the transmitter and the receiver, respectively, and a second channel code encoder 914 and a second channel code decoder 924 of FIG. 9B may not be included in the transmitter and the receiver. In case that the outer code is not used, the first channel code encoder 912 and the first channel code decoder 922 may be configured in the same way as a case that the outer code to be described later is used.

Referring to FIG. 9B, in case that the outer code is used, data to be transmitted may pass through the second channel code encoder 914. Bits or symbols that have passed through the second channel code encoder 914 may pass through the first channel code encoder 912. When the channel-coded symbols pass through a channel 902 and are received by the receiver, the receiver may perform a decoding operation sequentially using the first channel code decoder 922 and the second channel code decoder 924 based on the received signal. The first channel code decoder 922 and the second channel code decoder 924 may perform operations corresponding to the first channel code encoder 912 and the second channel code encoder 914, respectively.

Figure 10:
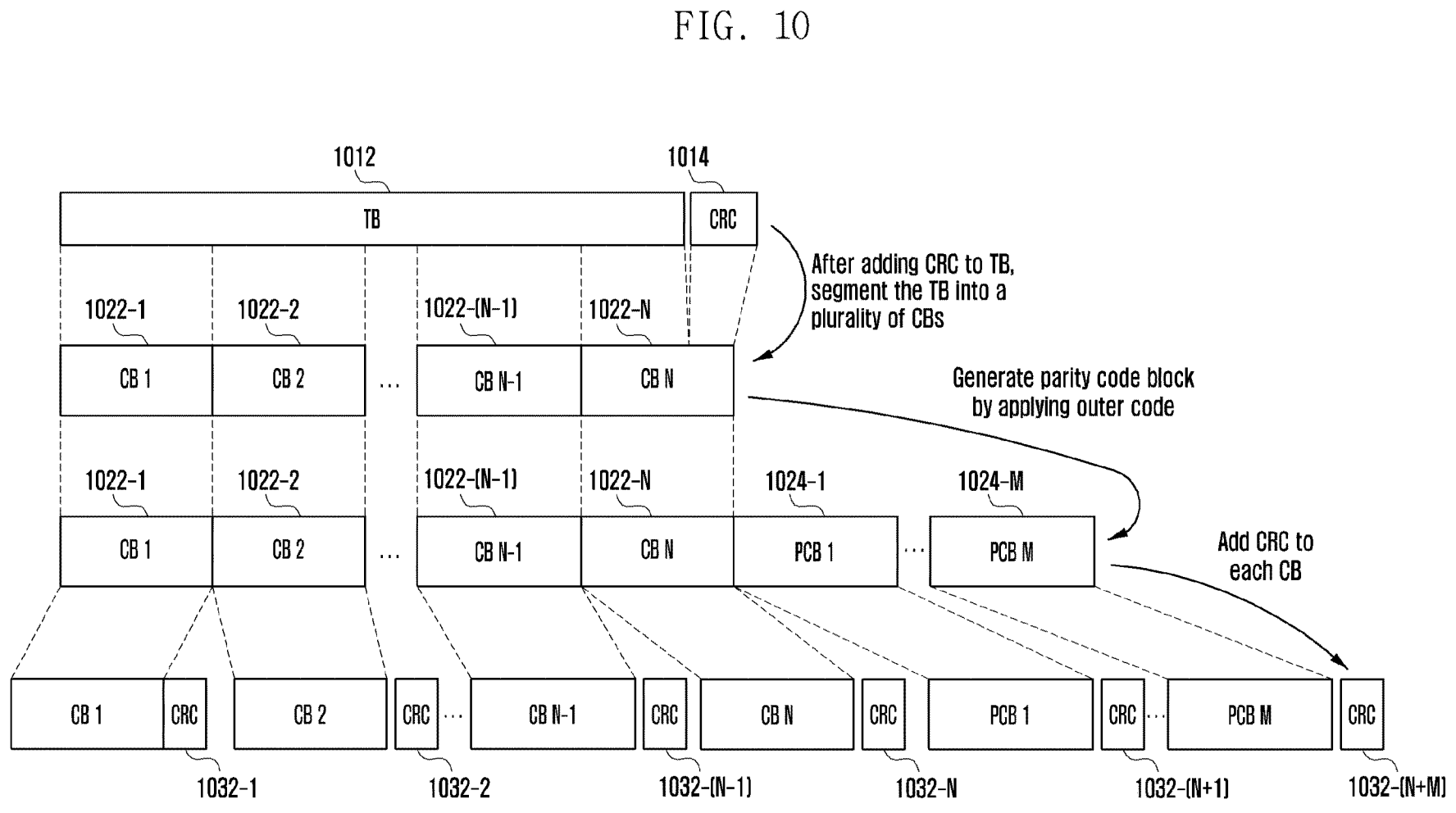

FIG. 10 illustrates an example of a process in which one TB is encoded in a wireless communication system according to an embodiment of the disclosure.

FIG. 10 illustrates a process of generating one or more parity CBs by applying a second channel code or an outer code to a plurality of TBs segmented from one TB.

Referring to FIG. 10, after a CRC 1014 is added to one TB 1012, they may be segmented into at least one CB or a plurality of CBs 1022-1 to 1022-N. In case that only one CB is generated according to the size of the TB 1012, the CRC may not be added to the corresponding CB. If an outer code is applied to the plurality of CBs 1022-1, 1022-2 to 1022-N, parity CBs (PCBs) 1024-1 to 1024-M may be generated.

In case that the outer code is used, the parity CBs 1024-1 to 1024-M may be positioned after the last CB 1022-N. After encoding using the outer code, CRCs 1032-1, 1032-2 to 1032-(N+M) may be added. Thereafter, the CBs and the parity CBs may be encoded according to the channel code along with the CRC.

In a wireless communication system according to various embodiments, the size of a TB may be calculated through the following steps. For convenience, in embodiments of the disclosure, each calculation step is specifically described for PDSCH, but it may be similarly applied to other channels (e.g., PUSCH). For example, each parameter for determining a TBS or NRE for the PUSCH may be configured based on the number of OFDM symbols allocated to the PUSCH, the DM-RS type, and overhead values configured per RB/PRB.

TBS Determination Method 1

Step 1: The number $N'_{RE}$ of REs allocated to PDSCH mapping in one PRB in the allocated resource can be calculated. $N'_{RE}$ can be determined based on at least one of the number of subcarriers included in one RB, the number of OFDM symbols allocated to the PDSCH, the number of REs to which DMRS is transmitted in one PRB, and the number of REs occupied by overhead in one PRB.

For example, $N'_{RE}$ may be calculated based on $N'_{RE}=N_{sc}^{RB} \cdot N_{symb}^{sh}-N_{DMRS}^{PRB}-N_{oh}^{PRB}$. $N_{sc}^{RB}$ denotes the number (e.g., 12) of subcarriers included in one RB, '5-""' denotes the number of OFDM symbols allocated to the PDSCH, $N_{DMRS}^{PRB}$ denotes the number of REs in one PRB, occupied by a demodulation reference signal (DMRS) of the same code division multiplexing (CDM) group, and $N_{oh}^{PRB}$ denotes the number (e.g., configured as one of 0, 6, 12, and 18) of REs occupied by an overhead in one PRB configured by higher signaling.

Thereafter, the total number $N_{RE}$ of REs allocated to the PDSCH may be calculated. $N_{RE}$ may be determined based on at least one of $N'_{RE}$ and the number of PRBs allocated to the UE, and may be calculated, for example, based on $N_{RE}=\min(156,N'_{RE}) \cdot n_{PRB}$. $n_{PRB}$ denotes the number of PRBs allocated to the UE.

Step 2: Thereafter, the number Ninfo of temporary information bits may be calculated. The number Ninfo of temporary information bits may be determined based on at least one of a code rate, a modulation order, the number of allocated layers, or $N_{RE}$.

For example, it may be calculated based on $N_{info}=N_{RE} \cdot R \cdot Q_m \cdot v$. R denotes a code rate, Qm denotes a modulation order, and v denotes the number of allocated layers. The code rate and the modulation order may be transferred using an MCS field included in the control information and a predefined corresponding relation.

A method of determining the TBS may vary according to the Ninfo value determined in the above process. That is, the method of determining the TBS may vary depending on a result of comparing the Ninfo value with a predetermined reference value. For example, if $N_{Info}\leq3824$, the TBS may be calculated according to step 3, otherwise, the TBS may be calculated according to step 4.

Step 3: An N'info value may be determined based on the Ninfo value. For example, the N'info value may be calculated based on $$N'_{info} = \max\left(24, 2^n \cdot \left\lfloor \frac{N_{info}}{2^n} \right\rfloor\right) \text{ and } n = \max(3, \lfloor \log_2(N_{info}) \rfloor - 6).$$

In addition, the TBS may be determined based on a predetermined table and the N'info value, and determined for example as a value closest to N'info among values not smaller than N'info in Table 7.

TABLE 7

| Index | TBS |
|---|---|
| 1 | 24 |
| 2 | 32 |
| 3 | 40 |

TABLE 7-continued

| Index | TBS |
|---|---|
| 4 | 48 |
| 5 | 56 |
| 6 | 64 |
| 7 | 72 |
| 8 | 80 |
| 9 | 88 |
| 10 | 96 |
| 11 | 101 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 818 |
| 51 | 888 |
| 52 | 928 |
| 53 | 984 |
| 54 | 1032 |
| 55 | 1061 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1541 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |

TABLE 7-continued

| Index | TBS |
|-------|-----|
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: The N'info value may be determined based on the Ninfo value. For example, the N'info value may be calculated based on $$N'_{info} = \max\left(3824, 2^n \times \text{round}\left(\frac{N_{info} - 24}{2^n}\right)\right) \text{ and}$$

$$n = \lfloor \log_2(N_{info} - 24) \rfloor - 5.$$

Thereafter, the TBS may be determined based on the N'info value and a predetermined equation, and determined for example, through a pseudo-code as shown in Table 8.

TABLE 8 if $R \leq 1/4$ $$TBS = 8 * C * \left\lceil \frac{N'_{info} + 24}{8 * C} \right\rceil - 24, \text{ where } C = \left\lceil \frac{N'_{info} + 24}{3816} \right\rceil$$

else if $N_{info} > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if end if

According to the TBS determination method 1, an accurate TBS may be determined using a specific calculation and the TBS table of Table 7 according to a range of Ninfo. That is, in order to perform the TBS determination method 1, the TBS table of Table 7 should be stored in the UE or the base station.

Meanwhile, a reference value $R=\frac{1}{4}$ or N'info value=8424 in step 4 of the TBS determination method 1 may be a value that cannot be configured. In this case, it is possible to change the reference value (R, N'info) to a reference value that can be actually configured in the system.

For example, according to 3GPP TS 38.212 document, because a largest code rate satisfying $R \leq \frac{1}{4}$ is 251/1024 in the 5G NR system, the above condition may be modified such as $R \leq 251/1024$. Similarly, because the value of $N'_{info}$ is quantized and cannot have a value of $8192 < N'_{info} < 8448$, the condition $N'_{info} > 8424$ shown in Table 8 may be changed such as $N'_{info} > 8192$ or $N'_{info} \geq 8448$. Alternatively, the condition $N'_{info} > 8424$ shown in Table 8 may be expressed as $N_{info} \geq 8344$ based on $N_{info}$.

In addition, in step 4, $$\left\lceil \frac{N'_{info} + 24}{8 \cdot C} \right\rceil,$$

$$\left\lceil \frac{N'_{info} + 24}{3816} \right\rceil,$$

$$\left\lceil \frac{N'_{info} + 24}{8424} \right\rceil,$$

and the like may be expressed more simply in common using the result of calculating $$\frac{N_{info}}{8}, \frac{N'_{info}}{8}, \text{ or } \frac{N'_{info} + 24}{8}.$$

For example, if $$N''_{info} = \frac{N'_{info} + 24}{8},$$

it may be calculated more simply such as $$C = \left\lceil \frac{N'_{info} + 24}{3816} \right\rceil = \left\lceil \frac{N''_{info}}{477} \right\rceil,$$

$$C = \left\lceil \frac{N'_{info} + 24}{8424} \right\rceil = \left\lceil \frac{N''_{info}}{1053} \right\rceil, \text{ or}$$

$$\left\lceil \frac{N'_{info} + 24}{8 \cdot C} \right\rceil = \left\lceil \frac{N''_{info}}{C} \right\rceil.$$

Because in $$\frac{N'_{info}}{8}, N'_{info} + 24$$

is always a multiple of 8 and $\frac{1}{8}$ is 2-3, it may be easily implemented as a bit-shift operation for integers. In addition, an embodiment of the disclosure proposes an efficient method for reducing the size of a TBS table required to determine a TBS and instead determining the TBS through a simple calculation. In a communication system according to various embodiments, the TBS may be calculated through the following steps.

TBS Determination Method 2

Step 1: The same as step 1 of the TBS Determination Method 1

Step 2: An intermediate number or a temporary value may be determined. The intermediate number may be determined based on at least one of the total number of REs allocated to the PDSCH, the modulation order, the number of allocated layers, and values related to the code rate. For example, the intermediate number may be expressed as X, and may be expressed as a first intermediate number to be distinguished from a Y value to be described later. The first intermediate number X may be determined based on equation $X = N_{RE} \cdot Q_m \cdot v \cdot A_R \cdot 2^{-13}$ (or $N_{info} \cdot 2^{-3}$ or $N_{RE} \cdot Q_m \cdot v \cdot R \cdot 2^{-3}$). $A_R$ which is the value related to the code rate is the value defined as $R * 1024$ in the MCS index table as shown in Table 9. It may refer to a numerator value when a target code rate is expressed as $A_R/1024$, and may be known when the MCS-related signaling field (IMCS) is received.

23

TABLE 9

| Example of MCS index table | | | |
|---|---|---|---|
| MCS Index↓ $I_{MCS}$ | Modulation Order↓ $Q_m$ | Target code Rate R × [1024] | Spectral efficiency |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

In the disclosure, the method for determining the TBS may vary according to a result of comparing the X value with a predetermined reference value.

For example, in case that the reference value is 478, if X≤478, the TBS may be determined using the following step 3, otherwise, the TBS may be determined using the following step 4.

In this case, if the value of X is smaller than a predetermined value (e.g., 478), the TBS may be determined using a predetermined calculation method and the value of X (first method) or may be directly determined based on a plurality of predetermined values (e.g., configured in the form of a table) and the X value. Additional reference values may be established to determine the above method. Meanwhile, if the value of X is greater than a predetermined value, the TBS may be determined based on another predetermined calculation method (the second method). In this case, the second method may be applied differently depending on the target code rate or the range of the X value.

However, embodiments of the disclosure are not limited thereto. That is, the number 478 is only one embodiment of the disclosure, and various values may be applied. In addition, the predetermined reference value may be configured in plurality.

For example, the X value may be compared with a first reference value (e.g., 478) and, if the X value is less than or equal to the first reference value, it may be compared again with a second reference value (e.g., 96) as in step 3. If the X value is less than or equal to (or less than) the second reference value, the TBS value may be determined by applying a predetermined calculation rule.

On the other hand, if the X value is greater than (or equal to or greater than) the second reference value, the TBS value may be determined by applying a predetermined rule and a plurality of predetermined values (e.g., configured as in Table 10). Since Table 10 has about half the size of the TBS table of Table 7, it is not necessary for the UE or the base station to store all values corresponding to the TBS.

For example, steps 3 and 4 may include the following method. However, the following method is only an example of the disclosure, and is not a limitation.

Step 3: If X≤478, the TBS is determined as follows.

If X≤96, the parameter Y may be determined as follows.

$$Y = \max\left(3, \left\lceil \frac{X}{24} \right\rceil \cdot \left\lceil \frac{X}{\left\lceil \frac{X}{24} \right\rceil} \right\rceil \right).$$

That is, when X is less than or equal to a predetermined value (96 in the above example), the second intermediate number Y value may be determined based on a predetermined equation, and the TBS may be determined based on this.

If 96≤X≤478, the nearest number not less than (i.e., greater than or equal to)

$$2^n \times \left\lfloor \frac{X}{2^n} \right\rfloor$$

may be determined as Y based on Table 10 below. $n = \lfloor \log_2(X) \rfloor - 6$.

TABLE 10

| | | | | |
|---|---|---|---|---|
| 101 | 149 | 201 | 277 | 357 |
| 106 | 153 | 209 | 285 | 372 |
| 111 | 157 | 217 | 301 | 388 |
| 116 | 161 | 225 | 309 | 405 |
| 123 | 165 | 233 | 317 | 421 |
| 129 | 169 | 241 | 325 | 437 |
| 133 | 177 | 253 | 333 | 453 |
| 141 | 185 | 261 | 341 | 469 |
| 145 | 193 | 269 | 349 | 478 |

$TBS = 2^3 \times Y$.

Step 4: If X>478, the TBS is determined as follows.

First, the parameter Y may be determined as follows:

$$Y = \max\left(483.2^n \times \text{Round}\left(\frac{X-3}{2^n}\right) + 3\right).$$

$$n = \lfloor \log_2(X-3) \rfloor - 5,$$

and Round(·) denotes a rounding function.

If $A_R \leq 251$, $$C = \left\lceil \frac{Y}{477} \right\rceil.$$

Otherwise, if Y>1053, $$C = \left\lceil \frac{Y}{1053} \right\rceil,$$

and if Y≤1053, C=1.

$$TBS = 2^3 \times \left( C \times \left\lceil \frac{Y}{C} \right\rceil - 3 \right)$$

With reference to the above TBS Determination Method 2, the temporary intermediate number X may be first determined based on the total number $N_{RE}$ of REs allocated to the PDSCH, the modulation order $Q_m$, the number b of allocated layers, and the value $A_R$ related to the code rate. In the 5G NR system, the code rate is expressed as $A_R \cdot 2^{-10}$ by the MCS table, and it can be seen that $N_{info}$ of the TBS Determination Method 1 or $X=N_{RE} \cdot Q_m \cdot v \cdot A_R \cdot 2^{-13}$ of the TBS Determination Method 2 are generally simple positive rational numbers whose denominator is in the form of $2^{(integer)}$.

Although it has been described in the disclosure that the X value is first compared with the first reference value and then compared with the second reference value, the operation of the disclosure is not limited thereto, and the order of the operation may be changed. That is, the transmitter may first compare the calculated X value with the second reference value in order to determine the TBS and, if it is small, may determine the TBS value by applying a predetermined calculation rule, or if it is large, may perform an operation of comparing with the first reference value.

In case that the value of X is greater than the first reference value (e.g., 478), the TBS may be determined using another calculation equation as in step 4. In the condition $A_R \le 251$ for determining the value of C corresponding to the number of code blocks in step 4, the value of 251 for the above determination may be changed. For example, the same change method as changing the code rate-related condition to $R \le \frac{1}{4}$ or $R \le 251/1024$ described in the TBS Determination Method 1 may be used. Similarly, the condition $Y > 1053$ may be changed to $Y > 1024$ or $Y \ge 1056$ Alternatively, the above condition may be expressed such as $X \ge 1043$ based on X.

However, because the method proposed in the disclosure does not need to actually calculate a code rate, a criterion may be configured by selecting an appropriate value $A_R$ from the MCS table. In fact, 251/1024 which is about 0.245 is a number smaller than $\frac{1}{4}$, but in the MCS table defined in the 5G NR, it is configured to 251 which is a largest value among $A_R$ values corresponding to a code rate less than or equal to $\frac{1}{4}$. In case that a $A_R$ value corresponding to a reference code rate value is different according to the system, the reference $A_R$ value may be changed.

For reference, the step 3 may be further subdivided as the TBS Determination Method 3 and the TBS Determination Method 4 according to the range of the X value.

TBS Determination Method 3

Step 1 and Step 2: Same as those of the TBS Determination Method 2

Step 3 (Modification 1 of Step 3 in the TBS Determination Method 2):

In case of $X \le 478$, the TBS may be determined as follows.

If $X \le 96$, the parameter Y may be determined based on the following equation:

$$Y = \max\left(3, \left\lceil \frac{X}{24} \right\rceil \cdot \left\lceil \frac{X}{\left\lceil \frac{X}{24} \right\rceil} \right\rceil \right).$$

if $96 < X \le 116$, the parameter Y may be determined based on the following equation. At this time, the number 116 is only an embodiment of the disclosure and does not limit the scope of the disclosure.

$$Y = \left\lceil \frac{X-1}{24} \right\rceil \cdot \left\lceil \frac{X-1}{\left\lceil \frac{X-1}{24} \right\rceil} \right\rceil + 1.$$

If $116 < X \le 478$, the nearest number not less than $$2^n \times \left\lfloor \frac{X}{2^n} \right\rfloor$$

may be determined as Y based on Table 11 below. $n = \lfloor \log_2 (X) \rfloor - 6$.

TABLE 11

| | | | | |
|---|---|---|---|---|
| 123 | 165 | 233 | 317 | 421 |
| 129 | 169 | 241 | 325 | 437 |
| 133 | 177 | 253 | 333 | 453 |
| 141 | 185 | 261 | 341 | 469 |
| 145 | 193 | 269 | 349 | 478 |
| 149 | 201 | 277 | 357 | |
| 153 | 209 | 285 | 372 | |
| 157 | 217 | 301 | 388 | |
| 161 | 225 | 309 | 405 | |

$TBS = 2^3 \times Y$.

TBS Determination Method 4

Step 1 and Step 2: Same as those of the TBS Determination Method 2

Step 3 (Modification 2 of Step 3 in the TBS Determination Method 2):

In case of $X \le 478$, the TBS may be determined as follows.

If $X \le 3$ (or $N_{RE} \cdot Q_m \cdot v \cdot A \cdot 2^{-13} \le 3$), the second intermediate number Y may be determined as a predetermined value. In this embodiment, it may be determined as $Y=3$.

If $3 < X \le 96$, the parameter Y may be determined based on the following equation:

$$Y = \left\lceil \frac{X}{24} \right\rceil \cdot \left\lceil \frac{X}{\left\lceil \frac{X}{24} \right\rceil} \right\rceil.$$

If $X > 96$, the TBS may be determined using the above-described TBS Determination Method 2 or TBS Determination Method 3, and since the detailed method is the same as described above, it will be omitted below.

With reference to step 3 of the TBS Determination Method 3, a method for determining the parameter Y according to the range of X may be further subdivided by using a new reference value (third reference value) 116. This makes the TBS table of Table 11 smaller than that of Table 10. As such, the more the equation is subdivided to determine the parameter Y, the smaller the TBS table becomes, but the calculation process may be complicated.

With reference to step 3 of the TBS Determination Method 4, it is an embodiment showing that the max(.) operation can be expressed in a different way. Note that it can be expressed in various ways while producing the same effect in the calculation process. It is also possible to derive a new calculation process by combining these modification methods with each other.

In the TBS Determination Method 2 to the TBS Determination Method 4, a method of determining the TBS based on the intermediate number X (e.g., the intermediate number X determined based on $X=N_{RE}\cdot Q_m\cdot v\cdot A_R\cdot 2^{-13}$) has been described. However, in the disclosure, as in the TBS Determination Method 1, a method of determining the TBS based on the intermediate number Ninfo (e.g., the intermediate number Ninfo determined based on $N_{info}=N_{RE}\cdot Q_m\cdot R\cdot v$) may be used.

However, the disclosure proposes a method of using a reference value for selecting a method for determining the TBS or a plurality of predetermined integer values somewhat differently from the TBS Determination Method 1. For example, in case of determining the TBS by using the TBS Determination Method 2 based on $N_{info}=N_{RE}\cdot Q_m\cdot R\cdot v$, it is almost the same as the TBS Determination Method 1, but step 3 may be modified as follows.

Example of Modification to Step 3 in TBS Determination Method 2

As described above, the method of determining the TBS may vary according to a result of comparing the Ninfo value with a predetermined reference value. In this case, the predetermined first reference value may be 3824.

Step 3: In case of $N_{info}\leq3824$, the TBS is determined as follows.

Meanwhile, the disclosure proposes a method of further using a second reference value, and in an embodiment, the second reference value may be 768.

If $N_{info}\leq768$, the TBS may be determined as follows:

$$TBS = \max\left(24, \left\lceil\frac{N_{info}}{192}\right\rceil \cdot \left\lceil\frac{N_{info}}{\left\lceil\frac{N_{info}}{192}\right\rceil}\right\rceil\right).$$

Otherwise (i.e., $768<N_{info}\leq3824$), the TBS may be determined based on a predetermined table. For example, the TBS may be determined as the nearest number that is not less than (i.e., greater than or equal to $$2^n\times\left\lfloor\frac{N_{info}}{2^n}\right\rfloor\right)$$

using Table 12 below. $n=\lfloor\log_2(N_{info})\rfloor-6$.

TABLE 12

| | | | | |
|---|---|---|---|---|
| 808 | 1192 | 1608 | 2216 | 2856 |
| 848 | 1224 | 1672 | 2280 | 2976 |
| 888 | 1256 | 1736 | 2408 | 3104 |
| 928 | 1288 | 1800 | 2472 | 3240 |
| 984 | 1320 | 1864 | 2536 | 3368 |
| 1032 | 1352 | 1928 | 2600 | 3496 |
| 1064 | 1416 | 2024 | 2664 | 3624 |
| 1128 | 1480 | 2088 | 2728 | 3752 |
| 1160 | 1544 | 2152 | 2792 | 3824 |

Meanwhile, in another embodiment, the TBS may be determined based on the Ninfo value ($N_{info}=N_{RE}\cdot Q_m\cdot R\cdot v$) and using the TBS Determination. Q Method 3. In this case, in step 3 of the TBS Determination Method 3, the condition $96<X\leq116$ is changed to $766<N_{info}\leq928$, and the condition $116<X\leq478$ is changed to $928<N_{info}\leq3874$, so that the TBS can be determined in the following way.

If $N_{info}\leq768$, the TBS may be determined based on a predetermined calculation method (first method). The predetermined calculation method may be determined as follows, for example:

$$TBS = \max\left(24, \left\lceil\frac{N_{info}}{192}\right\rceil \cdot \left\lceil\frac{N_{info}}{\left\lceil\frac{N_{info}}{192}\right\rceil}\right\rceil\right).$$

If $768<N_{info}\leq928$, the TBS may be determined based on another predetermined calculation method (second method). In this case, the following determination method may be considered.

$$TBS = \left\lceil\frac{N_{info}-8}{192}\right\rceil \cdot \left\lceil\frac{N_{info}-8}{\left\lceil\frac{N_{info}-8}{192}\right\rceil}\right\rceil + 1.$$

Also, if $928<N_{info}\leq3824$, the TBS may be determined based on predetermined information (e.g., integers except for the smallest 4 in Table 12). Similar modifications are also possible when determining the TBS based on $N_{info}=N_{RE}\cdot Q_m\cdot R\cdot v$ and the TBS Determination Method 4.

In general, because processing positive integers is more convenient than processing positive rational numbers in hardware, in embodiments of the TBS determination method, in case of converting $N_{info}$ or X to an integer and applying the calculation using a floor function, a ceiling function, or a round function, the calculation complexity may be further lowered.

For example, in the TBS Determination Method 1 to the TBS Determination Method 4, after calculating $N_{info}$ or X and then selecting a method for determining the TBS by comparing it with a first reference value (e.g., 3824 in case of using $N_{info}$, 478 in case of using X), it is possible to calculate the TBS by using values determined in an integer form such as $\lfloor N_{info}\rfloor$ or $\lfloor X\rfloor$ in actual operation.

In a specific example, when calculating main parameters in the TBS Determination Method 1 to the TBS Determination Method 4, it may be calculated in the following modified manner. That is, calculation of values may be possible by changing X described in the TBS Determination Method 1 to the TBS Determination Method 4 to an integer value $\lfloor X\rfloor$. For example, a value such as $$\lfloor\log_2(\lfloor X\rfloor)\rfloor, \lfloor\log_2((\lfloor X\rfloor-3)\rfloor(\text{or }\lfloor\log_2((\lfloor N_{info}\rfloor-24)\rfloor),$$

$$2^n\times\left\lfloor\frac{\lfloor X\rfloor}{2^n}\right\rfloor, \text{Round}\left(\frac{\lfloor X\rfloor-3}{2^n}\right)\left(\text{or Round}\left(\frac{\lfloor N_{info}\rfloor-24}{2^n}\right)\right),$$

$$Y = \left\lceil\frac{\lfloor X\rfloor}{24}\right\rceil \cdot \left\lceil\frac{\lfloor X\rfloor}{\left\lceil\frac{\lfloor X\rfloor}{24}\right\rceil}\right\rceil, Y = \left\lceil\frac{\lfloor X\rfloor-1}{24}\right\rceil \cdot \left\lceil\frac{\lfloor X\rfloor-1}{\left\lceil\frac{\lfloor X\rfloor-1}{24}\right\rceil}\right\rceil + 1$$

may be used.

A brief summary of the above process is as follows.

Based on the $N_{RE}\cdot Q_m\cdot v\cdot R$ or $N_{RE}\cdot Q_m\cdot v\cdot R\cdot 2^{-3}$ value, it is first compared with a first reference value (e.g., 3824 or 478), and then a method for determining the TBS is first determined.

Thereafter, the TBS value may be determined by converting the $N_{RE}\cdot Q_m\cdot v\cdot R$ or $N_{RE}\cdot Q_m\cdot v\cdot R\cdot 2^{-3}$ value into an integer by using a floor function, a ceiling function, or a round function and then applying the integer value to the determined method for determining the TBS. As a specific method for determining the TBS, various methods as well as the specific calculation method included in the TBS Determination Method 1 to the TBS determination method 4 may be applied. The above method may be simply expressed as in the following TBS Determination Method 5.

TBS Determination Method 5

Step 1: The same as that of the TBS Determination Method 1

Step 2: The temporary intermediate number $N_{info\_temp}=N_{RE}\cdot Q_m\cdot v\cdot R$ (or $X_{temp}=N_{RE}\cdot Q_m\cdot v\cdot A_R\cdot 2^{-13}=N_{RE}\cdot Q_m\cdot v\cdot R\cdot 2^{-3}$) may be determined.

If $N_{info\_temp}\leq 3824$ (or $X_{temp}\leq 478$), a TBS value is determined based on step 3, and if $N_{info\_temp}>3824$ (or $X_{temp}>478$), a TBS value is determined based on step 4.

Meanwhile, calculation of steps 3 and 4 may be based on $N_{info}=\lfloor N_{info\_temp}\rfloor=\lfloor N_{RE}\cdot Q_m\cdot v\cdot R\rfloor$ (or $X=\lfloor X_{temp}\rfloor=\lfloor N_{RE}\cdot Q_m\cdot v\cdot A_R\cdot 2^{-13}\rfloor=\lfloor N_{RE}\cdot Q_m\cdot v\cdot R\cdot 2^{-3}\rfloor$), which is an integer value of the temporary intermediate number.

Steps 3 and 4: The same as those of the TBS Determination Method 1, the TBS Determination Method 2, the TBS Determination Method 3, or the TBS Determination Method 4.

The disclosure has proposed a method of simplifying and minimizing the operation in a calculation process and using $\lfloor N_{RE}\cdot Q_m\cdot R\cdot v\rfloor$ or $\lfloor N_{RE}\cdot Q_m\cdot v\cdot A_R\cdot 2^{-13}\rfloor$ in the calculation process in order to determine the TBS by using a small table as shown in Table 10 instead of the TBS table shown in Table 7. The values of $N_{RE}$, $Q_m$, v are all positive integers, and there is an advantage that the operation of $2^{\pm(integer)}$ may be easily implemented as a general bit-shift operation.

In the 5G NR, an $A_R$ value is all positive integers except for cases of 682.5 and 916.5, and even in case that the $A_R$ value is 682.5 or 916.5, it may be easily implemented with an appropriate integer operation and a bit-shift operation. It may also be calculated such as $X=\lfloor N_{RE}\cdot Q_m\cdot v\cdot A_R\cdot 2^{-13}\rfloor$ or $X=\lfloor N_{RE}\cdot Q_m\cdot v\cdot R\cdot 2^{-3}\rfloor$. Similarly, even in case of calculating a value, it may also be calculated using a code rate R by using the $R=A_R\cdot 2^{-10}$ relationship or it may also be calculated based on $A_R$.

It can be proved by using the following two lemmas that the same result can be obtained in a method of determining the TBS using an integer value, $N_{info}=\lfloor N_{info\_temp}\rfloor$ or $X=\lfloor X_{temp}\rfloor$, instead of an intermediate number, which is generally a rational number in step 3 or less of the TBS Determination Method 1 to the TBS Determination Method 5 (i.e., after a specific method for TBS determination is determined), but a detailed description thereof will be omitted.

Lemma 1: For any positive integers x, m, and n and a positive real number y, the following is established:

$$\left\lfloor\frac{\left\lfloor\frac{y}{x^m}\right\rfloor}{x^n}\right\rfloor=\left\lfloor\frac{y}{x^{m+n}}\right\rfloor.$$

Lemma 2: For a positive integer n($\geq 3$) greater than or equal to 3 and a positive real number y($\geq 2^{n+3}$) greater than or equal to $2^{n+3}$, the following is established:

$$\mathrm{Round}\left(\frac{\left\lfloor\frac{y}{8}\right\rfloor-3}{2^n}\right)=\mathrm{round}\left(\frac{y-24}{2^{n+3}}\right).$$

In the 5G NR system, for a PDSCH allocated by a PDCCH having a DCI format 1_0 CRC-scrambled by P-RNTI or RA-RNTI, in a process of calculating Ninfo, a scaling factor S may be applied as follows. For example, Ninfo may be determined based on Equation $N_{info}=S\cdot N_{RE}\cdot R\cdot Q_m\cdot v$. S has values of 1, 0.5, 0.25, etc., and Ninfo may still be a positive rational value.

In the disclosure, in case of performing the operation using the intermediate number X instead of $N_{info}$, the scaling factor may be applied such as $X=N_{RE}\cdot Q_m\cdot v\cdot A_R\cdot 2^{-(13+s)}$, and in this case, the scaling factor may be defined as an integer value as shown in Table 13. The scaling factor S may be determined by a TB scaling field value in DCI as shown in Table 13. The operation of multiplying the scaling factor may be easily implemented by more performing the bit shift by S times in the process of determining X.

TABLE 13

| TB scaling field | Scaling factor S |
|---|---|
| 00 | 0 |
| 01 | 1 |
| 10 | 2 |
| 11 | |

The NDI or HARQ process ID signaled on the PDCCH and the TBS determined as above are reported to the upper layer.

In case that the TBS Determination Method 5 is applied, the TBS may be determined by configuring the temporary intermediate value as in $N_{info\_temp}=S\cdot N_{RE}\cdot R\cdot Q_m\cdot v$ or $X_{temp}=N_{RE}\cdot Q_m\cdot v\cdot A_R\cdot 2^{-(13+s)}$.

Hereinbefore, the method of determining the TBS using a rational intermediate number $N_{info}$ or X, or $N_{info}=\lfloor N_{info\_temp}\rfloor$ or $X=\lfloor X_{temp}\rfloor$ which is an integer intermediate number, has been described in step 3 or less (i.e., after a specific method for TBS determination is determined) in the TBS Determination Method 1 to the TBS Determination Method 5.

In case of determining the TBS by determining the intermediate number as an integer using a floor, ceiling, or round function from the beginning in the TBS Determination Method 1 to the TBS Determination Method 5, all processes for determining the TBS become very simple because of being configured with operations based on integers. (e.g., $N_{info}\triangleq\lfloor N_{RE}\cdot Q_m\cdot v\cdot R\rfloor$, $N_{info}\triangleq\lfloor N_{RE}\cdot Q_m\cdot v\cdot R\rfloor$, $\lfloor N_{RE}\cdot Q_m\cdot v\cdot R\cdot 2^{-3}\rfloor$, or $\lfloor N_{info}\cdot 2^{-3}\rfloor$)

However, this method may have the following problems. For example, in case that the $N_{info}$ value is between 3824 and 3825 (3824<$N_{info}$<3825) or the X value is between 478 and 479 (478<X<479), if $\lfloor N_{info}\rfloor$ or $\lfloor X\rfloor$ is used as an intermediate number, the values become 3824 or 478, respectively. Thus, it is necessary to use a TBS determination method based on calculation and a table corresponding to TBS candidate values defined to a plurality of integers. However, in the current 5G NR standard, because it is necessary to use a TBS determination method based on calculation without a table in case of $N_{info}$>3824 or X>478, it can be easily seen that different TBS values are determined.

The disclosure proposes a method of minimizing the computational complexity while fully or maximally maintaining compatibility with the existing 5G NR standard release-15 or release-16 when determining a TBS based on an integer form such as $N_{info}=\lfloor N_{RE}\cdot Q_m\cdot v\cdot R\rfloor$, $N_{info}\lceil N_{RE}\cdot Q_m\cdot v\cdot R\rceil$, $X=\lfloor N_{RE}\cdot Q_m\cdot v\cdot A_R\cdot 2^{-13}\rfloor$, or $X=\lceil N_{RE}\cdot Q_m\cdot v\cdot A_R\cdot 2^{-13}\rceil$ as an intermediate number without introducing a temporary intermediate number.

First, in the TS 38.214 document release-15 document of the 5G NR standard, three MCS index tables are defined for the PDSCH and two MCS index tables are defined for the PUSCH. In the MCS index table, spectral efficiency values corresponding to the modulation order and the code rate and the product of the modulation order and the code rate are indicated for each index. Therefore, in case that a value corresponding to the product of the modulation order and the code rate is required in the system, a spectral efficiency value may be used. However, because the spectral efficiency value included in the MCS index table is an approximate value, it may be slightly different from the actual value; thus, in some cases, in case that an accurate spectral efficiency value is required (e.g., a process of determining a TBS), it may be preferable to obtain the value by directly multiplying the modulation order and the code rate value rather than using the spectral efficiency value of the MCS table as it is.

For example, if there is a case such as ($N'_{RE}$=90, $n_{PRB}$=179, $Q_m$=2, R=120/1024, v=1) or ($N'_{RE}$=30, $n_{PRB}$=179, $Q_m$=2, R=120/1024, v=3) for an MCS index 0 of Table 9, $N_{RE} \cdot Q_m \cdot v \cdot R \cong 3775.78 < 3776$. However, in case that the spectral efficiency value 0.2344 defined in the MCS table of Table 9 is used instead of a $Q_m \cdot R$ value, because $N_{RE} \cdot v \cdot$ (Spectral efficiency)$\cong 3776.18 > 3776$ is established, the TBS value is determined to 3752 in the former case, and the TBS value is determined to 3824 in the latter case. That is, because different TBS values are determined, caution is required.

In a process of determining the TBS value, in order to calculate $N_{info}$ or X, the $Q_m \cdot R$ value may be easily determined according to the MCS index table. Currently, the 5G NR uses 3824 as a reference value for determining a step (or method) for determining the TBS. Assuming that the $N_{RE} \cdot v \cdot Q_m \cdot R$ value is accurately 3824, it may be arranged as in $N_{RE} \cdot v = 3824/(Q_m R)$, and in this case, because $N_{RE}$ or v is an integer, $3824/(Q_m R)$ should be also an integer. However, 3824 is a number that may be expressed as a product of 16 and 239, and 239 is a prime number. However, in the MCS index table, a value of $Q_m$ or $A_R$ corresponding to R cannot be a multiple of 239, and in order to establish $N_{RE} \cdot v = 3824/(Q_m R)$ because of a relationship of $N_{RE} = n_{PRB} \cdot min(156, N'_{RE})$, $n_{PRB}$=239 should be satisfied. When this is rearranged, it may be expressed as Equation 1 below.

$$N_{RE} \cdot v \cdot Q_m \cdot R = (n_{PRB} \cdot min(156, N'_{RE})) \cdot v \cdot Q_m \cdot A_R \cdot 2^{-10} \qquad \text{Equation 1}$$

$$= 239 \cdot min(156, N'_{RE}) \cdot v \cdot Q_m \cdot A_R \cdot 2^{-10} = 16 \times 239,$$

$$\Rightarrow min(156, N'_{RE}) \cdot v \cdot Q_m \cdot A_R = 2^{14},$$

In the MCS index table defined in the current 5G NR Release-15, it may be identified that Equation 1 does not establish regardless of the $N'_{RE}$ value except for the case of ($Q_m$=2, $A_R$=64) or ($Q_m$=1, $A_R$=128). (In the disclosure, a detailed description thereof will be omitted.) Therefore, Equation 1 may be simply expressed as Equation 2.

$$min(156, N'_{RE}) \cdot v = 2^7, v = 2^a(a=0,1,2,3) \Rightarrow N'_{RE} = 2^{7-a}, \qquad \text{Equation 2}$$

Equations 1 and 2 cannot be established unless v is an exponential form of 2, and in the 5G NR Release-15 or a standard or system compatible therewith, because the maximum value of v is less than 16, $v=2^a$ (a=0, 1, 2, 3) was defined. As a result, in order for the $N_{RE} \cdot v \cdot Q_m \cdot R$ value to be accurately 3824 in the 5G NR release-15, the $N'_{RE}$ value should have one of 16, 32, 64, and 128.

The $N'_{RE}$ value defined in the TBS Determination Method 1 is shown in Equation 3.

$$N'_{RE} = N_{sc}^{RB} \cdot N_{symb}^{sh} - N_{DMRS}^{PRB} - N_{oh}^{PRB}, \qquad \text{Equation 3}$$

$N_{sc}^{RB}$ is the number (e.g., 12) of subcarriers included in one RB, $N_{oh}^{PRB}$ is the number (e.g., configure to one of 0, 6, 12, and 18) of REs occupied by an overhead in one PRB configured by higher signaling (e.g., xOverhead in PDSCH-ServingCellConfig or xOverhead in PUSCH-ServingCell-Config); thus, it can be seen that the $N_{sc}^{RB} \cdot N_{symb}^{sh} - N_{oh}^{PRB}$ value is always a multiple of 6. Therefore, in specific circumstances, the $N'_{RE}$ value may not be 16, 32, 64, or 128 according to the $N_{DMRS}^{PRB}$ value.

For example, in the 5G NR system conforming to TS 38.212 document of 3GPP Release-15, in case that the DM-RS type was configured as in dmrs-Type=1 through DCI, the number of DMRS CDM groups without data is 1 or 2, and in this case, because each group is configured to 6 REs, the $N_{DMRS}^{PRB}$ value should also be at least a multiple of 6; thus a value of $N'_{RE} = N_{sc}^{RB} \cdot N_{symb}^{sh} - N_{DMRS}^{PRB} - N_{oh}^{PRB}$ is consequently a multiple of 6 (regardless of the number $N_{symb}^{sh}$ of symbols allocated to a PDSCH or PUSCH). In other words, $N'_{RE}$ cannot be an exponential number of 2 such as 16, 32, 64, or 128.

This means that the $N_{RE} \cdot v \cdot Q_m \cdot R$ value cannot be accurately 3824 in a system in which the $N'_{RE}$ value is not configured to a value such as 16, 32, 64, and 128. That is, because only rational numbers less than or greater than 3824 are possible as the $N_{RE} \cdot v \cdot Q_m \cdot R$ value, the criteria for determining step 3 or step 4 in the TBS Determination Method 1 to the TBS Determination Method 5 may be converted and used as follows.

Another Embodiment of Modification of Step 2 in TBS Determination Method

Step 1: Since it is the same as the method described above, it is omitted below.

Step 2: The intermediate number $N_{info} = \lfloor N_{RE} \cdot Q_m \cdot v \cdot R \rfloor$ (or $X = \lfloor N_{RE} \cdot Q_m \cdot v \cdot R \rfloor = \lfloor N_{RE} \cdot Q_m \cdot v \cdot A_R \cdot 2^{-13} \rfloor$) can be determined. That is, it is characterized in that the intermediate number is determined by further using the floor function in the above-described method.

If $N_{info}$<3824 (or X<478), the TBS value may be determined based on step 3, and if $N_{info} \geq 3824$ (or X≥478), the TBS value may be determined based on step 4. In addition, when a scaling factor S is applied in the process of calculating $N_{info}$ (or X), it may be applied like $N_{info} = \lfloor S \cdot N_{RE} \cdot R \cdot Q_m \cdot v \rfloor$ (or $X = \lfloor N_{RE} \cdot Q_m \cdot v \cdot A_R \cdot 2^{-(13+5)} \rfloor$ or $\lfloor N_{RE} \cdot Q_m \cdot v \cdot R \cdot 2^{-(3+5)} \rfloor$), and the scaling factor may have a value such as 0, 0.5, or 0.25, or may be defined as an integer value as shown in Table 13.

In the current 3GPP Release-15 or compatible 5G NR system, if there is no case in which $N_{RE} \cdot v = 3824/(Q_m R)$ is not accurately established (e.g., in case that it is not established regardless of the DM-RS type; in case that the above case does not establish regardless of a configuration such as dmrs-Type=1, dmrs-Type=2), in the TBS Determination Method 1 to the TBS Determination Method 5 or a method similar thereto, the TBS may be determined simply by integerizing the parameters in each calculation process by applying the above-described Another Embodiment of Modification of Step 2 in TBS Determination Method. For example, since Equation 1 cannot be established in a communication system that is always $n_{PRB}$<239, the TBS can be simply determined by integerizing the parameters required in each calculation process by applying the above-described Another Embodiment of Modification of Step 2 in TBS Determination Method.

Further, in the current 3GPP Release-15 or 5G NR system compatible therewith, if there is a case that $N_{RE} \cdot v = 3824/(Q_m R)$ is accurately established or is not established according to the system configuration (e.g., in case that whether the establishment of $N_{RE} \cdot v = 3824/(Q_m R)$ is changed according to the DM-RS type; in case of dmrs-Type=1, the above condition is not established and in case of dmrs-Type=2, the above condition is established), the TBS Determination Method 1 to the TBS Determination Method 5 or a method similar thereto is applied to determine the TBS under the conditions in which the above relationship may be established, and under the conditions in which the above relationship is not established, in the TBS Determination Method 1 to the TBS Determination Method 5 or a method similar thereto, by applying the above-described Another Embodiment of Modification of Step 2 in TBS Determination Method, a method of determining the TBS by integerizing parameters required in each calculation process may be applied.

In another embodiment, different TBS determination methods may be applied according to a modulation order or a code rate. In the current 3GPP Release-15 or a compatible mining the TBS by integerizing parameters required in each calculation process may be applied.

In case of MCS Table 3 for the PDSCH, in 3GPP Release-15 or Release-16, because a URLLC service, that is, a transport block error probability is highly likely to be used in case requiring a value of substantially (or approximately) about 0.00001, a different TBS determination method may be applied according to whether an instruction related to a target service or transport block error rate of the system or a corresponding MCS table configuration. For reference, because the URLLC service or transport block error probability uses different channel quality indicator (CQI) index tables in a scenario requiring a value of substantially (or approximately) about 0.00001, a different TBS determination method may be applied according to whether an instruction related to a configuration for the CQI index table.

---

A single PDSCH transport block with a combination of modulation scheme, target code rate and transport block size corresponding to the CQI index, and occupying a group of downlink physical resource blocks termed the CSI reference resource, could be received with a transport block error probability not exceeding: ˮ
0.1, if the higher layer parameter cqi-Table in CSI-ReportConfig configures 'table1' (corresponding to Table 5.2.2.1-2), or 'table2' (corresponding to Table 5.2.2.1-3), or ˮ
0.00001, if the higher layer parameter cqi-Table in CSI-ReportConfig configures 'table3' (corresponding to Table 5.2.2.1-4). ˮ

---

5G NR system, Equation 1 does not establish regardless of the $N'_{RE}$ value except for a case of ($Q_m$=2, R=64/1024, $A_R$=64) or ($Q_m$=1, R=128/1024, $A_R$=128) in the MCS index table.

Therefore, in case that the modulation order and the code rate correspond to ($Q_m$=2, R=64/1024, $A_R$=64) or (($Q_m$=1, R=128/1024, $A_R$=128), the TBS Determination Method 1 to the TBS Determination Method 5 or a method similar thereto is applied to determine the TBS, and in case that the modulation order or code rate does not correspond to ($Q_m$=2, R=64/1024, $A_R$=64) or ($Q_m$=1, R=128/1024, $A_R$=128), in the TBS Determination Method 1 to the TBS Determination Method 5 or a method similar thereto, by applying the above-described Another Embodiment of Modification of Step 2 in TBS Determination Method, a method of determining the TBS by integerizing parameters required in each calculation process may be applied.

The combination of the modulation order and the code rate may be indicated through the MCS table and MCS index configuration. (e.g., in case of PUSCH, ($Q_m$=1, R=128/1024, $A_R$=128) or ($Q_m$=2, R=64/1024, $A_R$=128) may be indicated by (MCS table 2, MCS index IMCS=3), and in case of PDSCH, ($Q_m$=2, R=64/1024, $A_R$=128) may be indicated to (MCS table 3, MCS index IMCS=3)

In still another embodiment, a method of determining different TBSs according to the MCS table configured in the system may be applied. For example, in case that the MCS table including a case of ($Q_m$=2, R=64/1024, $A_R$=64) or ($Q_m$=1, R=128/1024, $A_R$=128) is configured (e.g., MCS table 3 for PDSCH, MCS table 2 for PUSCH), the TBS Determination Method 1 to the TBS Determination Method 5 or a method similar thereto is applied to determine the TBS.

In case that the MCS table not including the modulation order or code rate combination is configured (e.g., MCS table 1 or 2 for PDSCH, MCS table 1 for PUSCH), in the TBS Determination Method 1 to the TBS Determination Method 5 or a method similar thereto, by applying the above-described Another Embodiment of Modification of Step 2 in TBS Determination Method, a method of deter- In yet another embodiment of the method for determining a TBS, it may be applied to a process of determining the TBS by configuration the intermediate number to $N_{info}\lfloor=N_{RE}\cdot Q_m\cdot R\cdot v\rfloor$ or $X=\lfloor N_{RE}\cdot Q_m\cdot v\cdot R\cdot 2^{-3}\rfloor=\lfloor N_{RE}\cdot Q_m\cdot v\cdot A_R\cdot 2^{-13}\rfloor$ from the beginning without introducing a temporary intermediate number in the TBS Determination Method 1 and the TBS Determination Method 2. However, in this case, there is a possibility that compatibility with the 5G NR system corresponding to the current 3GPP release-15 may not be maintained. As described above, in case that the $N_{RE}\cdot Q_m\cdot R\cdot v$ value is greater than 3824 and less than 3825, or in case that the $N_{RE}\cdot Q_m\cdot v\cdot R\cdot 2^{-3}$ value is greater than 478 and less than 479, the TBS value is defined differently from the case of configuring the intermediate number to an integer value by applying first to the floor function.

That is, in a first communication system conforming to the 3GPP Release-15, the TBS value becomes 3840 in case of 3824<$N_{RE}\cdot Q_m\cdot R\cdot v$<3825, but in a second communication system defined as $N_{info}=\lfloor N_{RE}\cdot Q_m\cdot R\cdot v\rfloor$, the TBS value becomes 3824 in case of 3824<$N_{RE}\cdot Q_m\cdot R\cdot v$<3825, which may be defined to different TBS values.

The first communication system and the second communication system may be implemented together in a device such as a single communication chip, module, or terminal, and in such a case, the device is characterized in that it includes a process of determining which standard is followed, and then determining differently the TBS according to a range of $N_{RE}\cdot Q_m\cdot R\cdot v$ values based on the $N_{RE}, Q_m, R, v$ value. That is, there is at least one case in which the TBS is determined differently for the same $N_{RE}\cdot Q_m\cdot R\cdot v$ value.

In addition, such a method has an advantage in that the intermediate number may be simply determined as an integer type, and that most TBS calculation formulas are also made in an integer type; thus, the operation becomes simpler. Further, when applying the scaling factor S in the process of calculating $N_{info}$ (or X), it may be applied as in $N_{info}=\lfloor S\cdot N_{RE}\cdot R\cdot Q_m\cdot v\rfloor$ (or $X=\lfloor N_{RE}\cdot Q_m\cdot v\cdot A_R\cdot 2^{-(13+s)}\rfloor$ or $X=\lfloor N_{RE}\cdot Q_m\cdot v\cdot R\cdot 2^{-(3+s)}\rfloor$), and the scaling factor may have values such as 0, 0.5, and 0.25, or may be defined to an integer value as shown in Table 11. Further, in a first communication system conforming to the 3GPP Release-15, in case of $3824 < S \cdot N_{RE} \cdot R \cdot Q_m \cdot v < 3825$, the TBS value becomes 3840, but in a second communication system defined to $N_{info} = \lfloor S \cdot N_{RE} \cdot R \cdot Q_m \cdot v \rfloor$, in case of $3824 < S \cdot N_{RE} \cdot Q_m \cdot R \cdot v < 3825$, the TBS value becomes 3824 and may be defined to different TBS values.

The first communication system and the second communication system may be implemented together in a device such as a single communication chip, module, or terminal, and in this case, the device is characterized in that it includes a process in which the TBS is determined differently according to a range of $S \cdot N_{RE} \cdot Q_m \cdot R \cdot v$ value based on the $S, N_{RE}$, $Q_m, R, v$ value after determining which standard is followed. That is, there is at least one case in which the TBS is determined differently for the same $S \cdot N_{RE} \cdot Q_m \cdot R \cdot v$ value.

Similarly, a simple TBS determination method may be applied using a Schilling function or a rounding function. For example, the TBS may be determined based on an intermediate number such as $N_{info} = \lceil S \cdot N_{RE} \cdot R \cdot Q_m \cdot v \rceil$ or $N_{info} = \text{Round}(S \cdot N_{RE} \cdot R \cdot Q_m \cdot v)$. The TBS may be determined based on an intermediate number such as $X = \lceil N_{RE} \cdot Q_m \cdot v \cdot A_R \cdot 2^{(-13+s)} \rceil$, $\lceil N_{RE} \cdot Q_m \cdot v \cdot R \cdot 2^{(-3+s)} \rceil$, Round $(N_{RE} \cdot Q_m \cdot v \cdot A_R \cdot 2^{(-13+s)})$, or Round$(N_{RE} \cdot Q_m \cdot v \cdot R \cdot 2^{(-3+s)})$. However, caution is required because these methods may not be compatible with the existing 5G NR system conforming to the 3GPP Release-15. (There is at least one case where the TBS is determined differently for the same $N_{RE} \cdot R \cdot Q_m \cdot v$ value or $S \cdot N_{RE} \cdot R \cdot Q_m \cdot v$ value)

In the 5G NR, an appropriate code block is configured according to the TBS value determined in this way, and LDPC encoding is performed for each code block. In this case, a process of determining the code block size (CBS) is as follows.

CBS Determination Method 1

An input bit sequence for code block segmentation is expressed as $b_0, b_1, \ldots, b_{B-1}$. (B>0) If B is larger than the maximum code block size $K_{cb}$, segmentation of the input bit sequence is performed, and a CRC of L=24 bits is additionally added to each code block. For an LDPC basic graph 1, the maximum code block size is $K_{cb} = 8448$, and for an LDPC basic graph 2, the maximum code block size is $K_{cb} = 3840$.

Step 1: The number C of code blocks is determined. The number of code blocks may be determined based on the number of input bits and the maximum code block size, for example, based on the following method.

If $B \leq K_{cb}$, L=0 and C=1, and B'=B.

Otherwise, L=24, $C = \lceil B/(K_{cb} - L) \rceil$, and B'=B+C·L.

Step 2: When a bit output from code block segmentation is $c_{r0}, c_{r1}, \ldots, c_{r(Kr-1)}$, r means the code block number ($0 \leq r < C$), and Kr (=K) means the number of bits of the code block for the code block number r. K, which is the number of bits included in each code block, may be determined based on at least one of the number of input bits and the number of code blocks. For example, the number of bits, K, included in each code block may be calculated as follows:

K'=B'/C;

In case of an LDPC basic graph 1, $K_b = 22$.

In case of an LDPC basic graph 2, if B>640, $K_b = 10$;

if $560 < B \leq 640$, $K_b = 9$;

if $192 < B \leq 560$, $K_b = 8$;

if $B \leq 192$, $K_b = 6$.

Step 3: Among Z values in Table 14, the minimum value $Z_c$ satisfying $K_b \cdot Z \geq K'$ may be determined. For the LDPC basic graph 1, it is configured to $K = 22Z_c$, and for the LDPC basic graph 2, it is configured to $K = 10Z_c$.

TABLE 14

| Set index ($i_{LS}$) | Set of lifting sizes (Z) |
| --- | --- |
| 0 | {2, 4, 8, 16, 32, 64, 128, 256} |
| 1 | {3, 6, 12, 24, 48, 96, 192, 384} |
| 2 | {5, 10, 20, 40, 80, 160, 320} |
| 3 | {7, 14, 28, 56, 112, 224} |
| 4 | {9, 18, 36, 72, 144, 288} |
| 5 | {11, 22, 44, 88, 176, 352} |
| 6 | {13, 26, 52, 104, 208} |
| 7 | {15, 30, 60, 120, 240} |

In step 2 of the CBS Determination Method 1, $K_b$ values correspond to columns or column blocks, respectively, corresponding to LDPC information bits in a basic graph (or basic matrix) or a parity check matrix of the LDPC code and corresponds to the maximum value (=$K_b Z_c$) of the LDPC information bit without shortening or zero-padding. For example, even if the number of column blocks (or columns) corresponding to information bits in the parity check matrix (or basic graph) of an LDPC basic graph 2 is 10, in case that it is configured to $K_b = 6$, LDPC encoding is substantially performed on the maximum $6Z_c$ bits of information bits, and information (bits corresponding to at least $(10 - K_b)Z_c = 4Z_c$ number of columns in the parity check matrix are shortened or zero-padded. Shortening or zero padding may actually allocate a bit value promised by the transmitter and the receiver, such as 0, or may mean not using a corresponding part in the parity check matrix.

Table 14 shows candidates of lifting sizes for LDPC encoding and decoding, lifting refers to a technique used for designing or converting a quasi-cyclic LDPC code. In particular, it refers to a method of supporting LDPC codes of various lengths by converting a following sequence by applying an operation (e.g., modulo or flooring operation) corresponding to a lifting size to a given sequence corresponding to the parity check matrix of the LDPC code. One number included in the sequence of the LDPC code may be a value corresponding to a circulant permutation matrix (or expressed as a circular permutation matrix, or the like).

In step 3 of the CBS Determination Method 1, a process of determining a $Z_c$ value by selecting a minimum value satisfying a given condition among Z values of the lifting size based on Table 14 is required. Further, because a set index to which the determined lifting size belongs indicates the parity check matrix of the LDPC code to which the LDPC encoding is to be applied to the code block, the UE or the base station may perform LDPC encoding or decoding based on the parity check matrix of the LDPC code corresponding to the set index to which the determined lifting size belongs. Therefore, in order to perform the CBS Determination Method 1, the lifting size table of Table 14 should be stored in the UE or the base station.

An embodiment of the disclosure proposes an efficient method for determining an accurate $Z_c$ value through simple calculation without Table 14 as a method for determining the lifting size Z in the process of determining the CBS. In a communication system according to various embodiments, the CBS may be calculated through the following steps:

CBS Determination Method 2

Step 1 and Step 2: Same as [CBS Determination Method 1]

In this embodiment, when K' and Kb are determined, the $Z_c$ value may be directly calculated or determined according to a predetermined calculation rule without candidates having a lifting size as shown in Table 14. In addition, by using a value $$\left(\text{e.g., } i_{LS\_temp} = \left\lceil \frac{Z_{temp}}{2^n} \right\rceil\right)$$

corresponding to the indicator of the parity check matrix calculated in the process of determining the $Z_c$ value and using Table 15, it is possible to simply determine the parity check matrix of the LDPC code to be used for LDPC encoding or decoding in the UE or the base station.

For example, a method of determining the $Z_c$ value and the parity check matrix of the LDPC code is as follows.

Step 3-1:

$$Z_{temp} = \left\lceil \frac{K'}{K_b} \right\rceil.$$

Step 3-2: $n = \lfloor \log_2 (Z_{temp}-1) \rfloor - 3$.

Step 3-3:

$$i_{LS\_temp} = \left\lceil \frac{Z_{temp}}{2^n} \right\rceil.$$

Step 3-4: $Z_c = 2^n \cdot i_{LS\_temp}$.

Set to $K=22Z_c$ for LDPC basic graph 1, and set to $K=10Z_c$ for LDPC basic graph 2.

TABLE 15

| Set index ($i_{LS}$) | $i_{LS\_temp}$ |
|---|---|
| 0 | 16 |
| 1 | 12 |
| 2 | 10 |
| 3 | 14 |
| 4 | 9 |
| 5 | 11 |
| 6 | 13 |
| 7 | 15 |

In summary, if K' and Kb are first determined, a temporary lifting size (Ztemp) may be first determined based on the two values. Then, an integer value (n) is determined (e.g., $n = \lfloor \log_2 (Z_{temp}-1) \rfloor - 3$) according to a predetermined rule based on the temporary lifting size, and an integer value ($i_{LS\_temp}$) corresponding to the indicator of the parity check matrix of the LDPC code is determined $$\left(\text{e.g., } i_{LS\_temp} = \left\lceil \frac{Z_{temp}}{2^n} \right\rceil\right)$$

based on the determined integer value (n) and the temporary lifting size (Ztemp). Finally, the final lifting size value $Z_c$ may be determined ($Z_c = 2^n \cdot i_{LS\_temp}$) based on the determined integer value (n) and the integer value ($i_{LS\_temp}$) corresponding to the indicator of the parity check matrix of the LDPC code.

Step 3 of the CBS Determination Method 2 is only an example and may be modified in various forms.

For example, as shown in the following Modification 1 of Step 3 of CTBS Determination Method 2, the integer value (n) may be limited to a positive integer through the max(.) operation. In this case, the $i_{LS\_temp}$ value may also be changed, and the index table corresponding to the LDPC parity check matrix may also be changed as shown in Table 16. In other words, it can be seen that although it has the same effect as Modification 1 of Step 3 of CTBS Determination Method 2, it can be expressed in various forms.
Modification 1 of Step 3 of CTBS Determination Method 2
Step 3-2: $n = \max(0, \lfloor \log_2 (Z_{temp}-1) \rfloor - 3$.

TABLE 16

| Set index ($i_{LS}$) | $i_{LS\_temp}$ |
|---|---|
| 0 | 8, 16 |
| 1 | 12 |
| 2 | 10 |
| 3 | 7, 14 |
| 4 | 9 |
| 5 | 11 |
| 6 | 13 |
| 7 | 15 |

In the CBS Determination Method 1, the Zc value may be finally determined using Table 14 including candidate values of the lifting size Z, and the LDPC parity check matrix may be determined accordingly. However, in case that a method of determining the Zc value based on the CBS Determination Method 1 is applied in a communication system, a set of lifting size candidates as shown in Table 14 may be modified into another form according to the communication system.

For example, in case that the TBS size increases from the smallest value to 24, 32, 40, 48, 56, 64, 72, 80, 88, 96, 104, . . . ., if it is fixed to Kb=6, the corresponding Z value sequentially increases to a value such as 7, 8, 10, 11, 12, 14, 15, 16, 17, 18, 20, . . . . Therefore, in this case, a lifting size candidate set as shown in Table 17 may be used.

TABLE 17

| Set index ($i_{LS}$) | Set of lifting sizes (Z) |
|---|---|
| 0 | {8, 16, 32, 64, 128, 256} |
| 1 | {12, 24, 48, 96, 192, 384} |
| 2 | {10, 20, 40, 80, 160, 320} |
| 3 | {7, 14, 28, 56, 112, 224} |
| 4 | {18, 36, 72, 144, 288} |
| 5 | {11, 22, 44, 88, 176, 352} |
| 6 | {26, 52, 104, 208} |
| 7 | {15, 30, 60, 120, 240} |

If 16 is included as the TBS size, the lifting size set for iLS=1 in Table 17 is changed to {6, 12, 24, 48, 96, 192, 384}, and if 8 is included as the TBS size, the lifting size set for iLS=0 is changed to {4, 8, 16, 32, 64, 128, 256}.

According to the CBS Determination Method 1 and the CBS Determination Method 2, the input bit sequence value B may be expressed as the sum of the TBS value A and the CRC bit size value LTB, B=A+LTB. The CRC bit size value LTB for the transport block may be configured differently according to the TBS value, as follows.

In case of A>3824, LTB=24, otherwise, LTB=16.

In embodiments based on various other modifications and combinations as well as the TBS Determination Method 1 to the TBS Determination Method 5, if TBS greater than 3824 or smaller than 3840 is not defined, it may be indicated, as follows.

In case of A≥3840, LTB=24, otherwise, LTB=16.

In addition, according to the CBS Determination Method 1 and the CBS Determination Method 2, a process in which the Kb value is determined differently according to the LDPC basic graph in step 2 is included. In case of the 5G NR, the LDPC basic graph may be determined based on the TBS value and the code rate indicated by the MCS, as follows:

In case of A≤292, or A≤3824 and R≤0.67, or R≤0.25, LDPC encoding is performed using LDPC basic graph 2.

Otherwise, LDPC encoding is performed using LDPC basic graph 1.

In general, the size of a data packet is a multiple of 8 in many cases because the communication system processes data in byte units. Also, in the communication system using the MCS table as shown in Table 9, the target code rate is expressed as $A_R/1024$. In case of R=0.67, the corresponding $A_R$ value is 686, and in case of R=0.25, it is 256. These values may not exist in the actual MCS table. Therefore, taking these characteristics into consideration, the method for determining the LDPC basic graph may be clearly expressed, as follows:

In case of A≤288, or A≤3824 and $A_R$≤682.5 (or $A_R$≤683), or $A_R$≤251, LDPC encoding is performed using LDPC basic graph 2.

Otherwise, LDPC encoding is performed using LDPC basic graph 1.

The reference value 682.5 (or 683) or 251 for the $A_R$ is configured as the maximum $A_R$ value in which the code rate does not exceed 0.67 and 0.25, respectively, in all MCS tables defined in the 5G NR communication system. For reference, the reference values can be replaced with corresponding specific values in the MCS table. For example, $A_R$≤682.5 or $A_R$≤251 may be expressed in a form such as R≤682.5/1024 or R≤251/1024 based on a code rate.

The LDPC basic graph may be basically determined based on the TBS size and code rate, but it may also be determined according to the MCS index in the configured MCS table. For example, when one of three MCS index tables for PDSCH and two MCS index tables for PUSCH is configured, LDPC encoding or decoding may be performed by determining the LDPC basic graph according to the MCS table index corresponding to the reference code rate in the configured MCS table.

When one CB is inputted to the LDPC encoder, parity bits may be added and outputted. In this case, the size of the parity bit may vary according to the LDPC base graph. According to a rate matching scheme, all parity bits generated by LDPC coding may be transmittable or only some of the parity bits may be transmittable. A scheme of processing all parity bits generated by LDPC coding to be transferable is referred to as 'full buffer rate matching (FBRM)', and a scheme of limiting the number of transmittable parity bits is referred to as 'limited buffer rate matching (LBRM)'. When resources are allocated for data transmission, the LDPC encoder output is inputted to a circular buffer, and bits of the buffer are repeatedly transmitted as much as the allocated resources.

Assuming that the length of the circular buffer is Ncb and the number of all parity bits generated by LDPC coding is N, in case of the FBRM scheme, $N_{cb}$=N. In case of the LBRM scheme, $$N_{cb} = \min(N, N_{ref}), N_{ref} = \left\lfloor \frac{TBS_{LBRM}}{C \cdot R_{LBRM}} \right\rfloor,$$

and $R_{LBRM}$ may be determined to 2/3. The above-described scheme of determining the TBS may be used for determining TBSLBRM. In this case, the number of layers may be assumed as the maximum number of layers supported by the UE in the corresponding cell, and the modulation order may be assumed as the maximum modulation order configured to the UE in the corresponding cell or, if not configured, as 64-QAM. The code rate may be assumed as 948/1024 which is the maximum code rate, NRE may be assumed as $N_{RE}$=156·$n_{PRB}$, and nPRB may be assumed as $n_{PRB}$=$n_{PRB,LBRM}$. nPRB,LBRM may be defined as shown in Table 18 below.

TABLE 18

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the wireless communication system according to various embodiments, the max data rate supported by the UE may be determined based on Equation 4 below.

$$\text{data rate (in } Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right) \qquad \text{Equation 4}$$

In Equation 4, J denotes the number of carriers bundled by carrier aggregation (CA), Rmax=948/1024, $v_{Layers}^{(j)}$ denotes the maximum number of layers of the carrier having an index j, $Q_m^{(j)}$ denotes the maximum modulation order of the carrier having an index j, $f^{(j)}$ denotes a scaling factor of the carrier having an index j, and μ denotes subcarrier spacing. $f^{(j)}$ is one value of 1, 0.8, 0.75, and 0.4, and may be reported by the UE, and μ may be given as shown in Table 19 below.

TABLE 19

| μ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$T_s^{\mu}$ is an average OFDM symbol length and may be calculated as $$T_s^{\mu} = \frac{10^{-3}}{14 \cdot 2^{\mu}},$$

and $N_{PRB}^{BW(j),\mu}$ is the maximum number of RBs in BW$^{(j)}$. $OH^{(j)}$ is an overhead value, may be given as 0.14 in a downlink and 0.18 in an uplink of FR1 (e.g., bands of 6 GHz or 7.125 GHz or lower), and may be given as 0.08 in a downlink and 0.10 in an uplink of FR2 (e.g., bands more than 6 GHz or 7.125 GHz). According to Equation 4, in a cell having a frequency bandwidth of 100 MHz in 30 kHz subcarrier spacing, the maximum data rate of the downlink may be calculated as shown in Table 20 below.

TABLE 20

| $f^{(j)}$ | $V_{Layers}^{(j)}$ | $Q_m^{(j)}$ | Rmax | $N_{PRB}^{BW(j), \mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that may be measured in actual data transmission of the UE may be a value obtained by dividing a data amount by a data transmission time. This may be a value obtained by dividing a TB size (TBS) in 1 TB transmission or the sum of TBSs in 2 TB transmission by a TTI length. For example, in a cell having a 100 MHz frequency bandwidth in 30 kHz subcarrier spacing, the maximum actual data rate of the downlink may be determined as shown in Table 21 below according to the number of allocated PDSCH symbols.

TABLE 21

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the UE may be identified through Table 20, and the actual data rate according to the allocated TBS may be identified through Table 21. In this case, depending on scheduling information, there may be a case where the actual data rate is greater than the maximum data rate.

In the wireless communication system, particularly, in the NR system, a data rate that the UE can support may be mutually agreed between the base station and the UE. This may be calculated using the maximum frequency band, the maximum modulation order, and the maximum number of layers supported by the UE.

However, the calculated data rate may be different from a value calculated from a transport block size (TBS) and a transmission time interval (TTI) length used for actual data transmission. Accordingly, the UE may receive allocation of a TBS larger than a value corresponding to a data rate supported by itself, and in order to prevent this, there may be restrictions on the TBS that may be scheduled according to the data rate supported by the UE. It may be necessary to minimize this case and define an operation of the UE in this case. Further, when applying the LBRM in the communication system defined in the current NR, the TBSLBRM is determined based on the number of layers or ranks supported by the UE, and the like, but the process is inefficient or the parameter configuration is ambiguous. Thus, there is a problem that it is difficult to stably apply the LBRM in the base station or the UE. Hereinafter, the disclosure will describe various embodiments for solving these problems.

Figure 11:
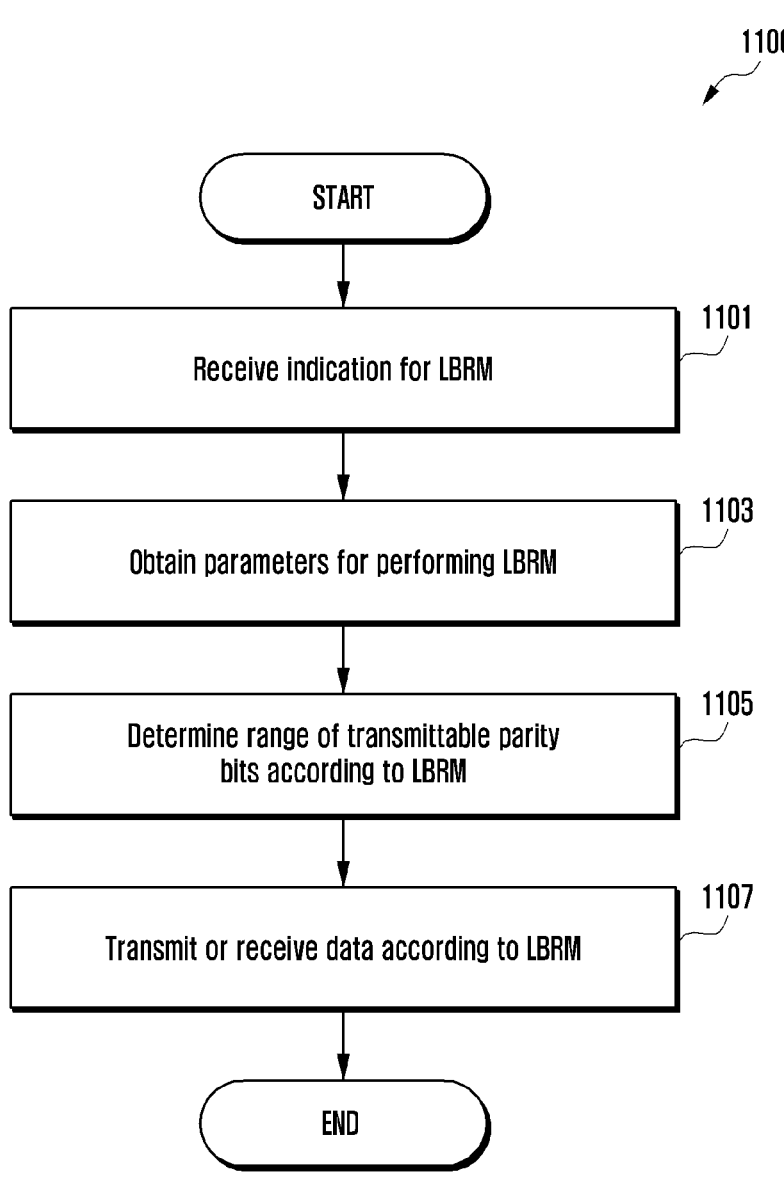
FIG. 11 illustrates a flowchart of a UE for transmitting or receiving data in a wireless communication system according to an embodiment of the disclosure.

FIG. 11 illustrates a flowchart of a UE for transmitting or receiving data in a wireless communication system according to an embodiment of the disclosure.

Referring to FIG. 11, in a method 1100, in operation 1101, the UE may receive an indication for LBRM. The indication for the LBRM may be included in information for configuring a channel (e.g., PUSCH or PDSCH) used for transmitting or receiving data. For example, the information for configuring the channel may be received through an RRC message. For example, the LBRM may be enabled by a 'rateMatching' parameter in a PUSCH-ServingCellConfig.

In operation 1103, the UE may obtain parameters for performing the LBRM. The parameters for performing the LBRM may include at least one of at least one parameter and code rate for calculating a TB size. Further, the parameter for calculating the TB size may include at least one of a maximum number of layers and a band combination applied to perform CA.

In operation 1105, the UE may determine a range of transmittable parity bits according to the LBRM. The LBRM is a technique of treating some of parity bits as transmittable bits and transmitting at least one of the transmittable bits through a channel.

Figure 12:
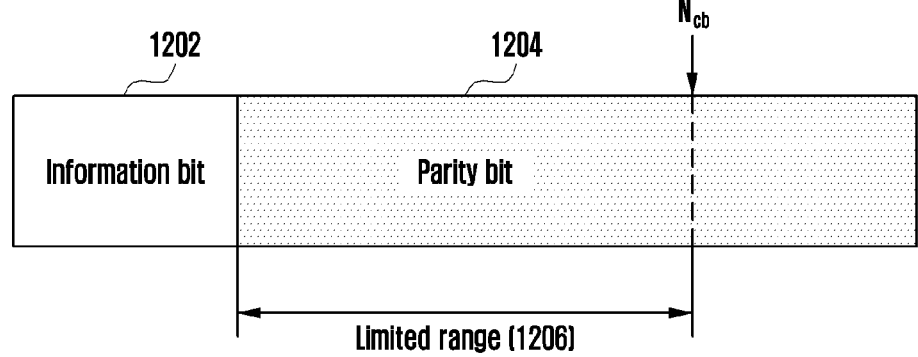
FIG. 12 illustrates an example of a range of transmittable bits according to limited buffer rate matching (LBRM) in a wireless communication system according to an embodiment of the disclosure.

FIG. 12 illustrates an example of a range of transmittable bits according to limited buffer rate matching (LBRM) in a wireless communication system according to an embodiment of the disclosure.

Referring to FIG. 12, bits within a limited range 1206 indicated by Ncb, which is the length of a circular buffer, among parity bits 1204 generated from information bits 1202 are transmittable, and the remaining bits are not transmitted even if a redundancy version (RV) is changed. Accordingly, the UE may determine which range of parity bits among the parity bits is to be treated as transmittable or receivable bits. Treating the bits as transmittable bits may be accomplished by inputting the bits to the circular buffer.

In operation 1107 of FIG. 11, the UE transmits or receives data according to the LBRM. In other words, in performing encoding or decoding, the terminal performs encoding or decoding in consideration of parity bits within a limited range. In case of downlink communication, the UE may operate a buffer of a size corresponding to a limited range in order to buffer received data. In case of uplink communication, the UE may generate parity bits by encoding information bits, and include at least one parity bit selected within a limited range among the generated parity bits in transmission data.

As described with reference to FIG. 11, the UE may perform the LBRM. To perform the LBRM, the UE determines a limited range for parity bits. To this end, it is required to determine a parameter (e.g., a band combination or maximum number of layers applied for a CA operation) for determining a limited range.

Hereinafter, embodiments for determining a parameter for determining a limited range will be described.

Uplink LBRM Implementation Plan

Various embodiments described below are for efficient uplink LBRM (e.g., UL-SCH LBRM or PUSCH LBRM) in data transmission. In case that PUSCH-LBRM is applied, a TBSLBRM may be determined based on the following configuration.

Configuration A for Rate Matching in Consideration of PUSCH-LBRM

The maximum number X of layers for one TB may be determined as follows, including at least two configuration steps in Table 22 below. (maximum number of layers for one TB for UL-SCH is given by X, where)

TABLE 22

| Configu-ration | Contents |
| --- | --- |
| 0 | If the higher layer parameters maxMIMO-Layers-BWP of PUSCH-ServingCellConfigBWP of all BWPs of the serving cell are configured, X is given by the maximum value across all the maxMIMO-Layers-BWP values of the serving cells. |
| 1 | Else if the higher layer parameter maxMIMO-Layers of PUSCH-ServingCellConfig of the serving cell is configured, X is given by that parameter. |
| 2 | Else if the higher layer parameter maxRank of pusch-Config of the serving cell is configured, X is given by the maximum value of maxRank across all BWPs of the serving cell. |
| 3 | Otherwise, X is given by the maximum number of layers for PUSCH supported by the UE for the serving cell. |

In an embodiment of Table 22, in case that the maximum number of layers is configured for a plurality of BWPs, X may be determined as the maximum value among the maximum number of layers. According to another embodiment, X may be determined as the minimum value among the maximum number of layers configured for the plurality of BWPs. According to still another embodiment, X may be determined as a value (e.g., a median value, an average value, or the like) determined based on the maximum number of layers configured for the plurality of BWPs.

Further, in the embodiment of Table 22, in case that maximum ranks are configured for the plurality of BWPs, X may be determined as the maximum value among the maximum ranks. According to another embodiment, X may be determined as the minimum value among the maximum ranks configured for the plurality of BWPs. According to still another embodiment, X may be determined as a value (e.g., a median value, an average value, or the like) determined based on the maximum ranks configured for the plurality of BWPs.

In the embodiment of Table 22, configuration 0 and configuration 2 may determine X based on all BWPs of the serving cell. However, according to another embodiment, X may be determined based on all active BWPs, active BWPs, or all configured BWPs. According to still another embodiment, X may be determined based on a plurality of BWPs satisfying a specific condition.

Operations of the UE for PUSCH-LBRM based on the above configuration will be described below with reference to FIGS. 13 and 14.

Figure 13:
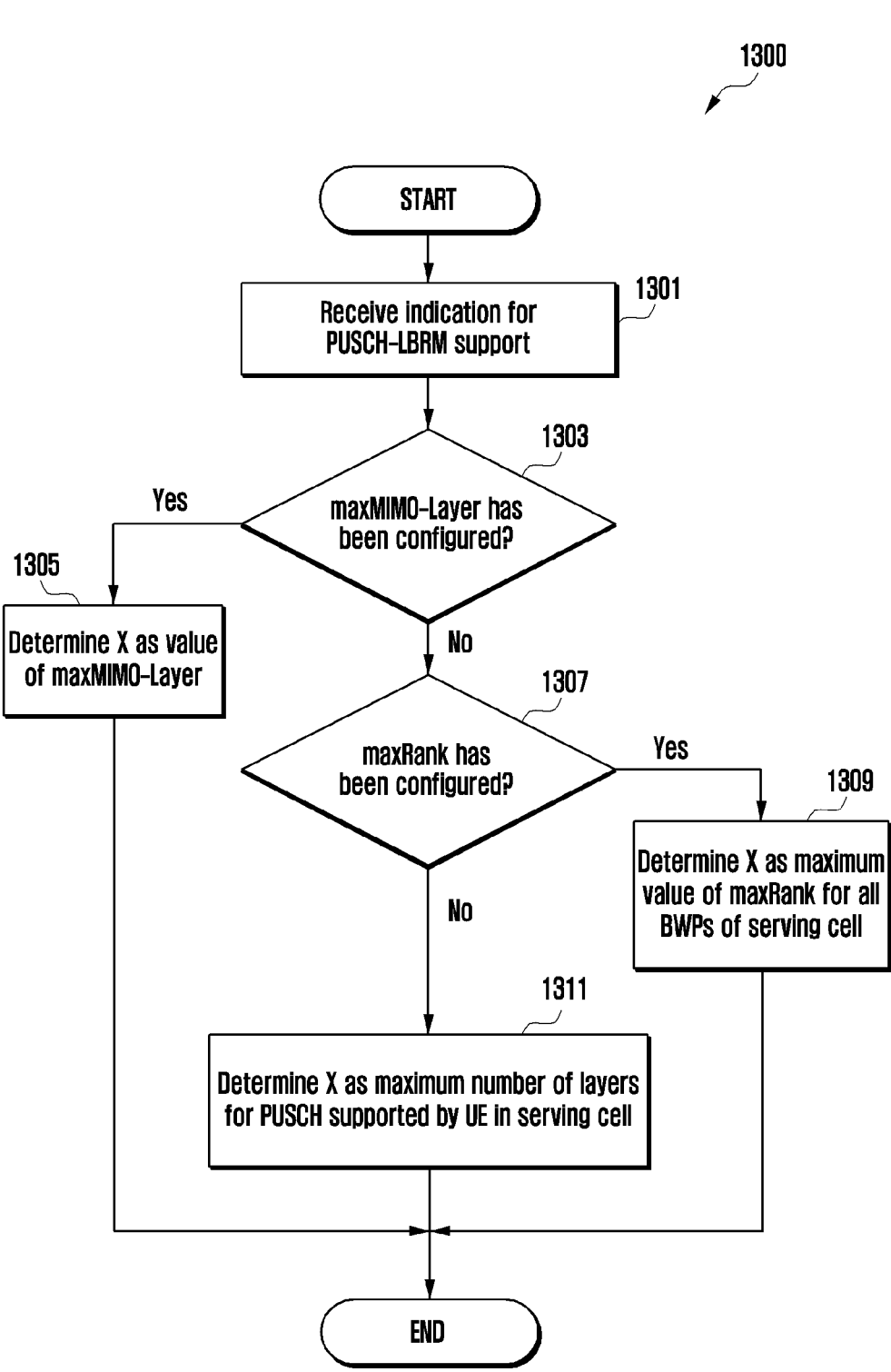
FIG. 13 illustrates a flowchart of a UE for determining the maximum number of layers in a wireless communication system according to an embodiment of the disclosure.

FIG. 13 illustrates a flowchart of a UE for determining the maximum number of layers in a wireless communication system according to an embodiment of the disclosure.

FIG. 13 illustrates an operation method of the UE 120.

Referring to FIG. 13, in a method 1300, in operation 1301, the UE may receive an indication for PUSCH-LBRM. The indication for the PUSCH-LBRM may be received through higher layer signaling (e.g., RRC signaling) or a downlink control signal (DCI). Alternatively, the indication for the PUSCH-LBRM may be preconfigured in the UE.

In operation 1303, the UE may identify whether a parameter maxMIMO-Layer has been configured. If the maxMIMO-Layer has been configured, the UE may determine X as the value of maxMIMO-Layer in operation 1305. If the maxMIMO-Layer has not been configured, the UE may identify in operation 1307 whether a parameter maxRank has been configured.

If the maxRank has been configured, the UE may determine X as the maximum value of the maxRank for all BWPs of the serving cell in operation 1309. If the maxRank has not been configured, the UE may determine X as the maximum number of layers for a PUSCH supported by the UE in the serving cell in operation 1311.

Figure 14:
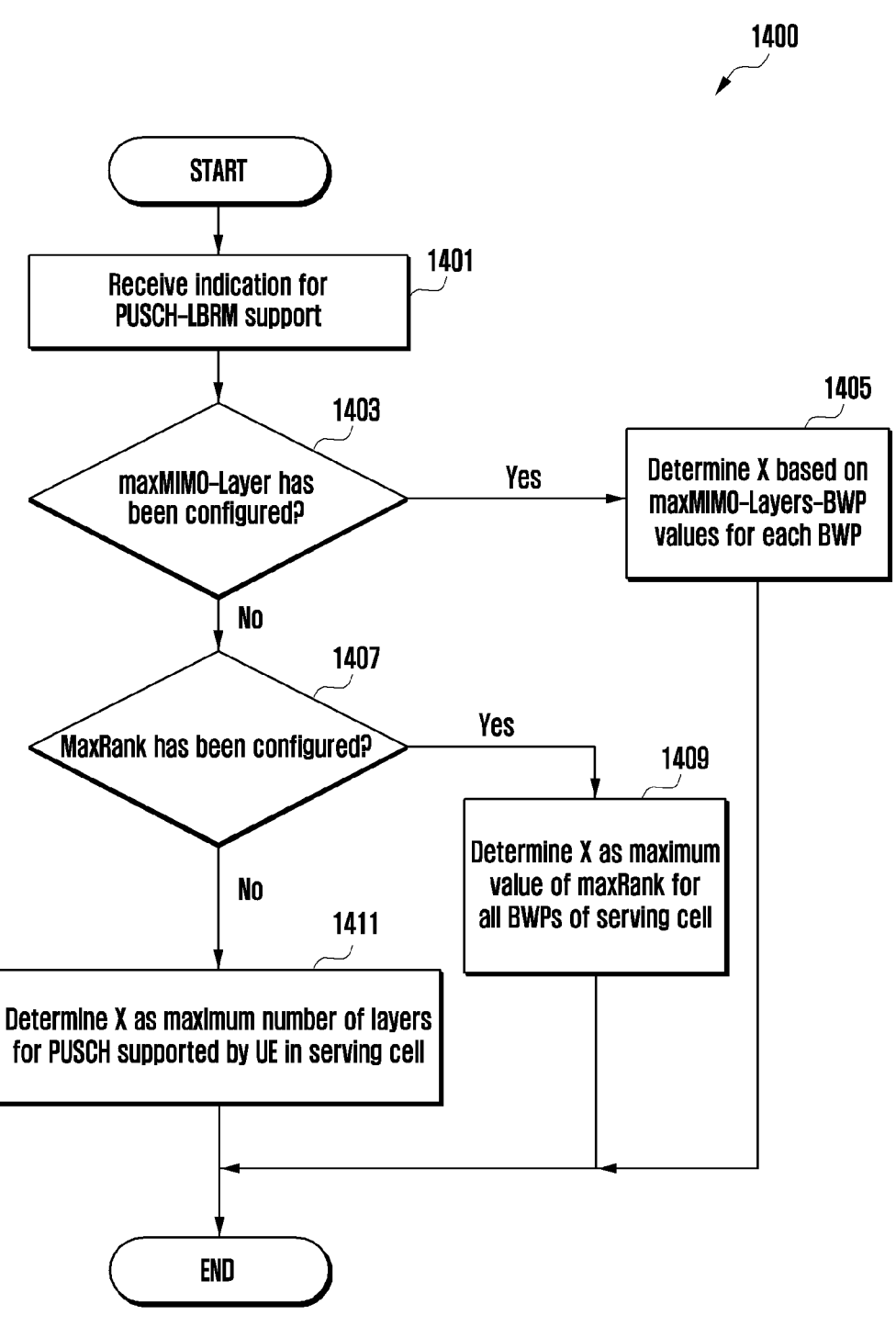
FIG. 14 illustrates another flowchart of a UE for determining the maximum number of layers in a wireless communication system according to an embodiment of the disclosure.

FIG. 14 illustrates another flowchart of a UE for determining the maximum number of layers in a wireless communication system according to an embodiment of the disclosure.

FIG. 14 illustrates a method of operating the UE 120. FIG. 14 illustrates an embodiment except for operations 1303 and 1305 in the embodiment of FIG. 13. The embodiment of FIG. 14 may be applied in case that the value of a parameter maxMIMO-Layers included in a PUSCH-ServingCellConfig configured in the base station is the same as a maxRank value included in a pusch-Config.

Referring to FIG. 14, in operation 1401, the UE may receive an indication for PUSCH-LBRM. The indication for the PUSCH-LBRM may be received through higher layer signaling (e.g., RRC signaling) or a downlink control signal (DCI). Alternatively, the indication for the PUSCH-LBRM may be preconfigured in the UE.

In operation 1403, the UE may identify whether a parameter maxMIMO-Layers-BWP has been configured. The parameter maxMIMO-Layers-BWP may be configured for each BWP for at least one BWP.

If the parameter maxMIMO-Layers-BWP has been configured, the UE determines X based on maxMIMO-Layers-BWP values for each BWP in operation 1405. For example, X may be determined as any one of a maximum value, a minimum value, an average value, or a median value of maxMIMO-Layers-BWP values. In this case, considered BWPs may be all BWPs, activated BWPs, or BWPs satisfying a specific condition.

If the parameter maxMIMO-Layers-BWP has not been configured, the UE may identify in operation 1407 whether a parameter maxRank has been configured. If the maxRank has been configured, the UE may determine X as the maximum value of the maxRank for all BWPs of the serving cell in operation 1409. If the maxRank has not been configured, the UE may determine X as the maximum number of layers for a PUSCH supported by the UE in the serving cell in operation 1411.

When the rate matching process in consideration of the above-described PUSCH-LBRM is rearranged, the changed configuration may be applied as follows.

Configuration B for Rate Matching in Consideration of PUSCH-LBRM

The maximum number X of layers for one TB may be determined as follows, including at least two configuration steps in Table 23 below. (maximum number of layers for one TB for UL-SCH is given by X, where)

TABLE 23

| Configu- ration | Contents |
| --- | --- |
| 0 | If the higher layer parameters maxMIMO-Layers-BWP of PUSCH-ServingCellConfigBWP of all BWPs of the serving cell are configured, X is given by the maximum value among maxMIMO-Layers-BWP. |
| 1 | Else if the higher layer parameter maxRank of pusch-Config of the serving cell is configured, X is given by the maximum value of maxRank across all BWPs of the serving cell. |
| 2 | Otherwise, X is given by the maximum number of layers for PUSCH supported by the UE for the serving cell. |

In an embodiment of Table 23, in case that the maximum number of layers is configured for a plurality of BWPs, X may be determined as the maximum value among the maximum number of layers. According to another embodiment, X may be determined as the minimum value among the maximum number of layers configured for the plurality of BWPs. According to still another embodiment, X may be determined as a value (e.g., a median value, an average value, or the like) determined based on the maximum number of layers configured for the plurality of BWPs.

Further, in the embodiment of Table 23, in case that maximum ranks are configured for the plurality of BWPs, X may be determined as the maximum value among the maximum ranks. According to another embodiment, X may be determined as the minimum value among the maximum ranks configured for the plurality of BWPs. According to still another embodiment, X may be determined as a value (e.g., a median value, an average value, or the like) determined based on the maximum ranks configured for the plurality of BWPs.

In addition, configuration 0 and configuration 1 of the embodiment of Table 23 may determine X based on all BWPs of the serving cell. However, depending on the system, X may be used based on all active BWPs or all configured BWPs, or may be used based on a plurality of BWPs satisfying a specific condition.

Although a system in which signaling information including maxMIMO-Layers-BWP is PUSCH-ServingCellConfigBWP has been described in the embodiments of Table 22 and Table 23, this is only an example of a method of indicating or instructing a BWP-specific maxMIMO-Layer value, and a name or parameter of such signaling information may be generally configured as any other name depending on a communication system or version information of the system.

According to another embodiment, for rate matching in consideration of PUSCH-LBRM, parameters may be configured in consideration of a band combination and a feature set related to at least one serving cell (or at least one configured serving cell). For example, the maximum number of layers may be determined in consideration of a signaled or indicated band combination and function set related to the serving cell. A related embodiment will be described in the following Configuration C for Rate Matching in Consideration of PUSCH-LBRM.

Configuration C for Rate Matching in Consideration of PUSCH-LBRM

The maximum number X of layers for one TB may be determined as follows, including at least two configuration steps in Table 24 below. (maximum number of layers for one TB for UL-SCH is given by X, where)

TABLE 24

| Configu- ration | Contents |
| --- | --- |
| 0 | If the higher layer parameter maxMIMO-Layers of PUSCH-ServingCellConfig of the serving cell is configured, X is given by that parameter. |
| 1 | Else if the higher layer parameter maxRank of pusch-Config of the serving cell is configured, X is given by the maximum value of maxRank across all BWPs of the serving cell. |
| 2 | Otherwise, X is given by the maximum number of layers for PUSCH supported by the UE for any signaled band combination and feature set consistent with the serving cell. |

In configuration 2 of Table 24, because the UE does not have a common understanding of a currently applied band combination with the base station, X may be determined as the largest supported number of layers in consideration of all band combinations.

For successful decoding, the above-described rate matching schemes in consideration of LBRM should maintain the same configuration or promised configuration in both the base station and the UE or both the transmitter and the receiver. In this case, various combinations of configurations mentioned in the disclosure are possible.

The configuration steps included in the configuration methods of Tables 22, 23, and 24 are not necessarily included. For example, in case of Table 22, if the system does not require a configuration condition related to maxRank, the configuration 2 may be omitted or replaced with another configuration. Also, the order of configuration steps included in the configuration methods of Tables 22, 23, and 24 may be changed.

For example, in case of Table 22, if the configuration of the serving cell is prioritized over the configuration of the BWP of the serving cell, the order of the configuration 0 and configuration 1 may be changed to the order of the configuration 1 and configuration 0. In addition, changing the configuration order and omitting some configurations (e.g., configuration 2) may be applied simultaneously. Further, the respective configurations in Tables 22, 23, and 24 may be applied interchangeably. For example, configurations in consideration of the band combination, like the configuration 2 of Table 21, may be applied to one of the configurations of Table 22 or 23.

Downlink LBRM Implementation Plan

Various embodiments to be described below relate to efficient downlink LBRM (e.g., PDSCH-LBRM, DL-SCH LBRM, or PCH LBRM) in data transmission. Hereinafter, the disclosure will describe an embodiment of PDSCH- LBRM, but the described embodiment may also be applied to DL-SCH LBRM or PCH LBRM.

The TBSLBRM may be determined based on the maximum number of layers of PUSCH or PDSCH configured in higher layer signaling (e.g., RRC signaling). However, because the maximum number of layers is not determined until information on UE capability is reported from the UE to the base station, a problem may occur in applying the LBRM.

Figure 15:
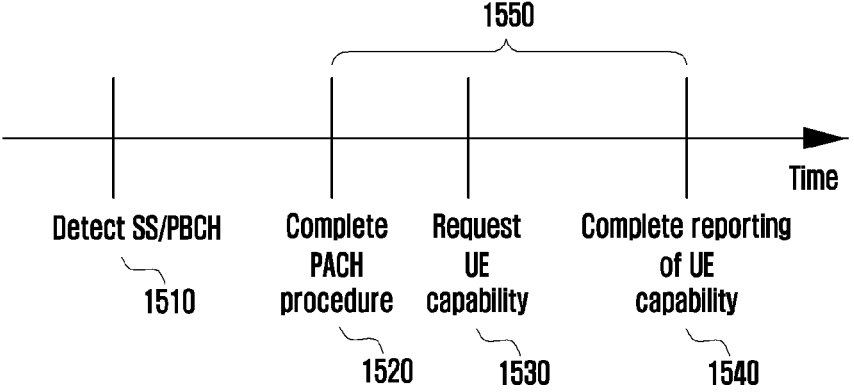
FIG. 15 illustrates an example of an interval in which ambiguity of parameters required to perform LBRM occurs in a wireless communication system according to an embodiment of the disclosure.

FIG. 15 illustrates an example of an interval in which ambiguity of parameters required to perform LBRM occurs in a wireless communication system according to an embodiment of the disclosure.

FIG. 15 illustrates an example of events occurring in an initial access process of the UE.

Referring to FIG. 15, a synchronization signal (SS)/ physical broadcast channel (PBCH) is detected by the UE at a first time point 1510, a random-access channel (RACH) procedure is completed at a second time point 1520, UE capability information is requested at a third time point 1530, and reporting of UE capability information is completed at a fourth time point 1540.

In an interval 1550 between the second time point 1520 and the fourth time point 1540, there is a possibility that configurations for the maximum number of layers of PUSCH or PDSCH are different between the base station and the UE. In this case, PUSCH decoding may not be appropriately performed in the base station, and PDSCH decoding may not be appropriately performed in the UE. In other words, because the UE cannot immediately decode the PDSCH after the RACH procedure, the UE may not receive any RRC message. Therefore, a rule between the base station and the UE for determining the maximum number of layers of the PUSCH or the PDSCH until the UE capability is reported to the base station is required.

As one of solutions to the above problem, a method of fixing the value X of the maximum number of layers to a predetermined value or integer during the interval 1550 of FIG. 15 may be considered. For example, a specific integer such as X=1 or X=2 may be used, or a method of determining a specific value mandated to the UE as the maximum number of layers in the band may be defined. In the following embodiments, X=1 is exemplified, but the disclosure is not limited thereto.

Configuration A for Rate Matching in Consideration of PDSCH-LBRM

The maximum number of layers for one TB may be determined as the minimum value of X and 4 calculated including at least two configuration steps in Table 25 below. (maximum number of layers for one TB for DL-SCH is given by X, where)

TABLE 25

| Configuration | Contents |
|---|---|
| 0 | If the higher layer parameters maxMIMO-Layers-BWP of PDSCH-ServingCellConfigBWP for all BWPs of the serving cell are configured, X is given by the maximum value across all the maxMIMO-Layers-BWP values of the serving cells. |
| 1 | Else if the higher layer parameter maxMIMO-Layers of PDSCH-ServingCellConfig of the serving cell is configured (or given), X is given by that parameter. |
| 2 | Else if the higher layer parameter maxNumberMIMO-LayersPDSCH is configured (or given), X is given by that parameter. |
| 3 | Otherwise, X = 1. |

All of configuration steps included in the configuration methods of Table 25 above are not necessarily included. For example, in case that the configuration 2 of Table 25 is unnecessary in the system, it may be omitted or replaced with another configuration. For example, according to another embodiment, the configuration 2 in Table 25 may be replaced with the following condition.

TABLE 26

| Configuration | Contents |
|---|---|
| 2 | If the higher layer parameters maxMIMO-Layers-BWP of PDSCH-ServingCellConfigBWP of all BWPs of the serving cell are configured, X is given by the maximum value among maxMIMO-Layers.- else if the higher layer parameter maxNumberMIMO-LayersPDSCH is configured (or given), X is given by the maximum number of layers for PDSCH supported by the UE for the serving cell. |

Further, the order of the configuration steps included in the configuration methods of Table 25 may be changed. For example, if the configuration of the serving cell is prioritized over the configuration of the BWP of the serving cell, the order of the configuration 0 and configuration 1 may be changed to the order of the configuration 1 and configuration 0. In addition, changing the configuration order and omitting some configurations or replacing them with other types may be applied simultaneously. For example, it may be expressed in the form shown in Table 27 below.

TABLE 27

| Configuration | Contents |
|---|---|
| 0 | If the higher layer parameter maxMIMO-Layers of PDSCH-ServingCellConfig of the serving cell is configured, X is given by that parameter. |
| 1 | Else if all the BWP of the serving cell is configured with maxMIMO-Layers, X is given by the maximum values across all the BWP-specific maxMIMO-Layers values of the serving cell. |
| 2 | Otherwise, X is given by the maximum number of layers for PDSCH supported by the UE for the serving cell. |

In the configuration 3 of Table 25, X may be configured as an integer different from 1 or may be configured as a different parameter. For reference, a process of determining X based on all BWPs of the serving cell in the embodiment of Table 25 or Table 26 may be used based on all active BWPs or all configured BWPs depending on a system or may be used based on a plurality of BWPs satisfying a specific condition. Further, by briefly summarizing the configurations 2 and 3 of Table 25, in case of not corresponding to the configurations 0 and 1, it may be replaced by determining X as the maximum number of layers for PDSCH supported by the UE for the serving cell.

Although a system in which signaling information including maxMIMO-Layers-BWP is PDSCH-ServingCellConfigBWP has been described in the embodiments of Table 25 and Table 26, this is only an example of a method of indicating the value of BWP-specific maxMIMO-Layers, and a name or parameter of such signaling information may be generally configured as another name depending on a communication system or version information of the system. For example, the configuration 0 of Table 25 is only an embodiment of a method of determining X as the maximum value of all values of BWP-specific maxMIMO-Layers of the serving cell in case that all BWPs of the serving cell are generally configured as maxMIMO-Layers.

Figure 16:
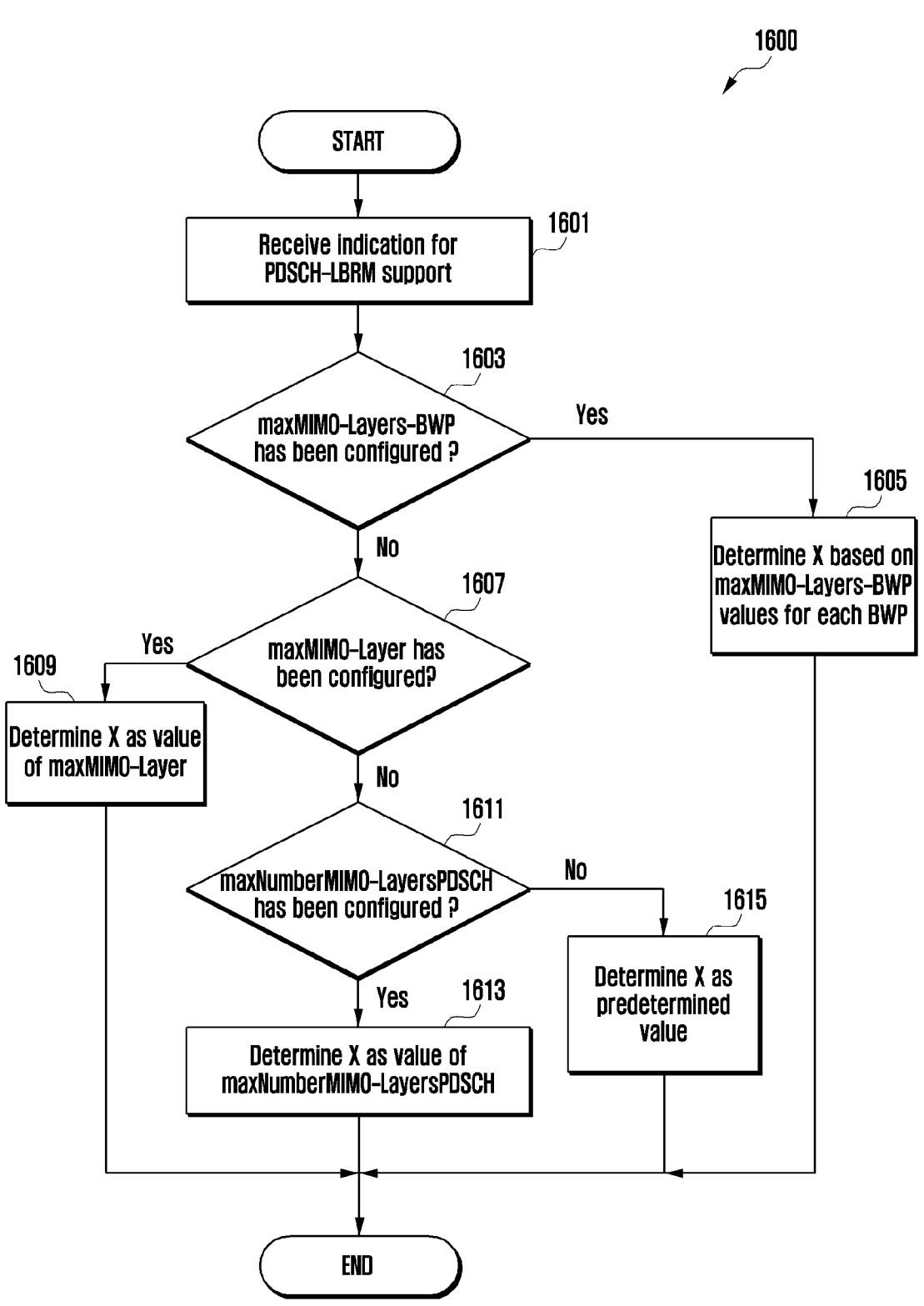
FIG. 16 illustrates another flowchart of a UE for determining the maximum number of layers in a wireless communication system according to an embodiment of the disclosure.

The operation of the UE according to the rule shown in Table 25 is as FIG. 16.

FIG. 16 illustrates another flowchart of a UE for determining the maximum number of layers in a wireless communication system according to an embodiment of the disclosure.

FIG. 16 illustrates an operation method of the UE 120.

Referring to FIG. 16, in a method 1600, in operation 1601, the UE may receive an indication for PDSCH-LBRM. The indication for the PDSCH-LBRM may be received through higher layer signaling (e.g., RRC signaling) or a downlink control signal (DCI). Alternatively, the indication for the PDSCH-LBRM may be preconfigured in the UE.

In operation 1603, the UE may identify whether a parameter maxMIMO-Layers-BWP has been configured. The parameter maxMIMO-Layers-BWP may be configured for each BWP for at least one BWP.

If the parameter maxMIMO-Layers-BWP has been configured, the UE may determine X based on maxMIMO-Layers-BWP values for each BWP in operation 1605. For example, X may be determined as any one of a maximum value, a minimum value, an average value, and a median value of maxMIMO-Layers-BWP values. In this case, considered BWPs may be all BWPs, activated BWPs, or BWPs satisfying a specific condition.

If the parameter maxMIMO-Layers-BWP has not been configured, the UE may identify in operation 1607 whether a parameter maxMIMO-Layer has been configured. If the maxMIMO-Layer has been configured, the UE may determine X as a value of maxMIMO-Layer in operation 1609.

If the maxMIMO-Layer has not been configured, the UE may identify in operation 1611 whether a parameter maxNumberMIMO-LayersPDSCH has been configured.

If the maxNumberMIMO-LayersPDSCH has been configured, the UE may determine X as a value of maxNumberMIMO-LayersPDSCH in operation 1613. If the maxNumberMIMO-LayersPDSCH has not been configured, the UE may determine X as a predetermined value (e.g., 1) in operation 1615.

According to another embodiment, parameters may be configured in consideration of a band combination and function set related to at least one serving cell (or at least one configured serving cell) for rate matching in consideration of PDSCH-LBRM. For example, in determining the maximum number of layers, the maximum number of layers may be determined in consideration of any signaled or indicated band combination and function set related to the serving cell. A related embodiment will be described in the following Configuration B for Rate Matching in Consideration of PDSCH-LBRM.

Configuration B for Rate Matching in Consideration of PDSCH-LBRM

The maximum number of layers for one TB may be determined as the minimum value of X and 4. (maximum number of layers for one TB for DL-SCH is given by the minimum of X and 4, where)

TABLE 28

| Configu-ration | Contents |
|---|---|
| 1 | If the higher layer parameter maxMIMO-Layers of PDSCH-ServingCellConfig of the serving cell is configured, X is given by that parameter. |

TABLE 28-continued

| Configu-ration | Contents |
|---|---|
| 2 | Otherwise, X is given by the maximum number of layers for PDSCH supported by the UE for any signaled band combination and feature set consistent with the serving cell. |

In the configuration 2 of Table 28, because the UE does not have a common understanding of the currently applied band combination with the base station, X may be determined as the largest supported number of layers in consideration of all band combinations.

For reference, respective configurations in Tables 25 and 28 may be applied interchangeably. For example, configurations in consideration of the band combination, like the configuration 2 of Table 28, may be applied to one of the configurations of Table 25 or 26.

A specific embodiment of the parameter configuration for applying the LBRM of the disclosure may be expressed as follows.

Configuration C for Rate Matching in Consideration of PDSCH-LBRM

Configuration 1: If a maxNumberMIMO-LayersPDSCH is configured in higher layer signaling, the maximum number of layers (v) for one TB may be configured as a smaller value (or a smaller or same value) of two by comparing the maxNumberMIMO-LayersPDSCH with a predetermined value (e.g., 4). If the maxNumberMIMO-LayersPDSCH is not configured, the maximum number of layers for one TB is configured as 1.

Configuration 2: If a mcs-Table is configured as qam256 in higher layer signaling, it is assumed that the maximum modulation order is $Q_m=8$. Otherwise, it is assumed that the maximum modulation order is $Q_m=6$.

Configuration 3: The maximum code rate is configured as R=948/1024.

Configuration 4: It is configured that NRE=156* $N_{PRB,LBRM}$. However, the value of $N_{PRB,LBRM}$ means the maximum number of PRBs across all configured BWPs for a carrier.

The above-described configurations may be expressed as follows.

```
- if maxNumberMIMO-LayersPDSCH provided,
    v = min(maxNumberMIMO-LayersPDSCH, 4);
  else
    v = 1;
- if mcs-Table = qam256,
      Qm = 8;
    else
      Qm = 6;
- R = 948/1024;
    - NRE = 156*NPRB,LBRM
```

As in the above-described Configuration C for Rate Matching in Consideration of PDSCH-LBRM, if parameters for determining the maximum number of layers for one TB is configured in higher layer signaling, the maximum number of layers may be determined based on the configured value. However, if the corresponding parameters are not configured in higher layer signaling, the maximum number of layers may be configured as a predetermined value (e.g., v=1, 2, 3, or . . . ) or as a value determined according to a predetermined rule.

Similarly, if parameters for determining the maximum modulation order are configured in higher layer signaling, the maximum modulation order may be determined based on the configured value. However, if the corresponding parameters are not configured in higher layer signaling, the maximum modulation order may be configured as a predetermined value or as a value determined according to a predetermined rule.

In addition, the condition for the mcs-Table may be modified in various forms. For example, depending on the BWP of the serving cell, and depending on whether qam256 has been configured in the mcs-Table, the maximum modulation order may be configured. For example, in various methods implemented, Qm may be configured as 8 in case that qam256 has been configured for a mcs-Table for one or more BWPs, or Qm may be configured as 8 in case that qam256 has been configured for a mcs-Table for all BWPs. In addition, a similar method may be implemented based on the value of mcs-TableTransformPrecoder instead of the mcs-Table.

Various embodiments have been described above focusing on the operation of the UE. However, for encoding or decoding to which the LBRM is applied in the base station, the base station may perform the same parameter configuration operation as that of the UE and then perform encoding or decoding. In this case, the operation of the base station is similar to the above-described operation of the UE. Further, various combinations of the PUSCH-LBRM operation and the PDSCH-LBRM operation proposed in the disclosure may be applied to the LBRM method of the base station and the UE. In other words, in using the rate matching schemes in consideration of the above-described LBRM for successful decoding, both the base station and the UE or both the transmitter and the receiver should maintain the same configuration or the promised configuration. In this case, various combinations of configurations described in the disclosure are possible.

In general, the LBRM may affect performance because some of the parities may not be transmitted due to buffer limitations. For this reason, the base station or the UE may configure the MCS so that the LBRM is not applied to the maximum or is minimized. For example, after calculating the TBS for each MCS, the base station or the UE may determine whether the LBRM is applied in cases of scheduling with each MCS, and may not use the MCS to which the LBRM is determined to be applied. In other words, the base station or the UE may use one MCS among MCSs to which the LBRM is not applied.

In some cases, even if the LBRM is applied, in order to minimize its effect, the base station or the UE may configure a relatively high or highest MCS, among MCS to which the LBRM is applied, as the final MCS. Determination on whether the LBRM is applied may be made by comparing the N value and the $N_{ref}$ value for each MCS. For example, if $N > N_{ref}$, the LBRM may be applied, otherwise, the LBRM may not be applied.

As described above, the method of controlling applying the LBRM through the MCS configuration may be applied differently depending on a stand-alone (SA) operation or a non-stand-alone (NSA) operation in a system after 5G. In case of a communication system or network to which the SA operation scheme is applied, applying the LBRM is controlled through the MCS configuration, but in case of a communication system or network to which the NSA operation scheme is applied, the control on whether to apply the LBRM through the MCS configuration may not be applied.

Conversely, in case of a communication system or network to which the NSA operation scheme is applied, applying the LBRM is controlled through the MCS configuration, but in case of a communication system or network to which the SA operation scheme is applied, the control on whether to apply the LBRM through the MCS configuration may not be applied. Further, although applying the LBRM is controlled through the MCS configuration for all of SA/NSA operation schemes, a specific rule may be defined differently. The SA operation is a scheme in which a first cellular network (e.g., legacy network) and a second cellular network (e.g., 5G network) are independently operated, and the NSA operation is a scheme in which the first cellular network and the second cellular network are operated by being connected to each other. When two networks are connected and operated, it means that at least one network controls the operation of the other network.

In addition, an operation method of a UE in a communication system for the above embodiments includes steps of determining a number of allocated resource elements ($N_{RE}$), determining a number of layers (v), determining a modulation order ($Q_m$) and a value ($A_R$) corresponding to a code rate based on a field value corresponding to an MCS contained in DCI, determining a temporary intermediate value ($X_{temp}$) based on the number of allocated resource elements ($N_{RE}$), the number of layers (v), the modulation order ($Q_m$), and the value ($A_R$) corresponding to the code rate, determining a method to identify a transport block size (TBS) based on the temporary intermediate value, determining an intermediate integer value (X) based on the temporary intermediate value ($X_{temp}$), and determining the transport block size based on the intermediate integer value.

The step of determining the transport block size further includes a step of determining a transport block through a calculation based on the intermediate integer value or based on the intermediate integer value and a plurality of integer values in case that the intermediate integer value is less than or equal to a first threshold. In case that the intermediate integer value is greater than the first threshold, in the step of determining the transport block through the calculation based on the intermediate integer value, different methods are applied depending on the target code rate or the intermediate integer value.

In addition, an operation method of a UE in a communication system for the above embodiments includes steps of determining a number (B) of input bits, determining a number (C) of code blocks based on the number of input bits, determining a size (K') of a temporary code block based on the number of input bits and the number of code blocks, determining a number ($K_b$) of columns corresponding to LDPC information word bits in an LDPC basic graph, determining a temporary lifting size ($Z_{temp}$) based on the size of the temporary code block and the number of columns, determining a lifting size of an LDPC code based on the temporary lifting size, and performing LDPC encoding based on a parity check matrix and the lifting size of the LDPC code.

The step of determining the lifting size includes steps of determining a first integer value (n) based on the temporary lifting size and a predetermined rule, determining a second integer value ($i_{LS\_temp}$) corresponding to an LDPC parity check matrix indicator based on the temporary lifting size and the integer value, determining an LDPC parity check matrix based on the second integer value, and determining the lifting size of the LDCP code based on the first integer value and the second integer value.

In addition, an operation method of a UE in a communication system for the above embodiments includes steps of determining a number ($N_{RE}$) of resource elements (RE) allocated to the terminal, determining an intermediate value based on the number of the REs, in case that the intermediate value is smaller than a first reference value, determining a size of a transport block based on a predetermined first method and the intermediate value, or determining the size of the transport block based on the intermediate value and a plurality of predetermined values, and in case that the intermediate value is greater than the first reference value, determining the size of the transport block based on the intermediate value.

Further, in a communication system for the above embodiments, a UE includes a transceiver and a controller configured to determine a number ($N_{RE}$) of resource elements (RE) allocated to the terminal, to determine an intermediate value based on the number of the REs, in case that the intermediate value is smaller than a first reference value, to determine a size of a transport block based on a predetermined first method and the intermediate value, or determine the size of the transport block based on the intermediate value and a plurality of predetermined values, and in case that the intermediate value is greater than the first reference value, to determine the size of the transport block based on the intermediate value.

In addition, an operation method of a UE in a communication system for the above embodiments includes steps of determining a number (B) of input bits, determining a number (C) of code blocks based on the number of input bits, determining a size (K') of a temporary code block based on the number of input bits and the number of code blocks, determining a number ($K_b$) of columns corresponding to LDPC information word bits in an LDPC basic graph, determining a temporary lifting size ($Z_{temp}$) based on the size of the temporary code block and the number of columns, determining a lifting size of an LDPC code based on the temporary lifting size, and performing LDPC encoding based on a parity check matrix and the lifting size of the LDPC code.

Further, in a communication system for the above embodiments, a UE includes a transceiver and a controller configured to determine a number (B) of input bits, to determine a number (C) of code blocks based on the number of input bits, to determine a size (K') of a temporary code block based on the number of input bits and the number of code blocks, to determine a number ($K_b$) of columns corresponding to LDPC information word bits in an LDPC basic graph, to determine a temporary lifting size ($Z_{temp}$) based on the size of the temporary code block and the number of columns, to determine a lifting size of an LDPC code based on the temporary lifting size, and to perform LDPC encoding based on a parity check matrix and the lifting size of the LDPC code.

Meanwhile, in the drawings for explaining the method of the disclosure, the order of description does not necessarily correspond to the order of execution, and the precedence relationship may be changed or parallel execution may be possible.

Also, in the drawings for explaining the method of the disclosure, some components may be omitted and only some components may be included without impairing the essence of the disclosure.

In addition, the method of the disclosure may be implemented in a combination of some or all of the contents contained in respective embodiments within a range that does not impair the essence of the disclosure.

The methods according to embodiments set forth in claims or specification of the disclosure may be implemented in the form of hardware, software, or a combination thereof.

When implemented in software, a computer readable memory medium storing one or more programs (software modules) may be provided. One or more programs stored in the computer readable memory medium are configured for execution by one or more processors in an electronic device. One or more programs include instructions for causing an electronic device to execute methods according to embodiments described in claims or specifications of the disclosure.

Such programs (software modules, software) may be stored in a random access memory, a non-volatile memory including a flash memory, a read only memory (ROM), an electrically erasable programmable ROM (EEPROM), a magnetic disc memory device, a compact disc-ROM (CD-ROM), digital versatile discs (DVDs), other types of optical memory devices, or magnetic cassettes. Alternatively, such programs may be stored in a memory configured with a combination of some or all thereof. Further, each configuration memory may be included in the plural.

Further, the program may be stored in an attachable memory device that may access through a communication network such as Internet, Intranet, a local area network (LAN), a wide area network (WAN), or a storage area network (SAN), or a communication network configured with a combination thereof. Such a memory device may access to a device implementing an embodiment of the disclosure through an external port. Further, a separate memory device on the communication network may access to the device implementing the embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal in a communication system, the method comprising:
   determining a number ($N_{RE}$) of resource elements (REs) allocated to the terminal;
   determining an intermediate value based on the $N_{RE}$;
   in case that the intermediate value is greater than or equal to a first reference value, determining a size of a transport block based on the intermediate value and a first equation;
   in case that the intermediate value is between the first reference value and a second reference value being smaller than the first reference value, determining the size of the transport block based on the intermediate value and a plurality of predetermined values; and
   in case that the intermediate value is smaller than or equal to the second reference value, determining the size of the transport block based on the intermediate value and a second equation,
   wherein the first reference value is 3824, and the second reference value is smaller than the first reference value.

2. The method of claim 1, wherein, in case that the intermediate value is greater than the first reference value, the first equation depends on whether a value corresponding to a code rate is greater than a predetermined value.

3. The method of claim 1, further comprising:
   in case that the intermediate value is smaller than a third reference value being smaller than the second reference value, determining the size of the transport block based on a predetermined value.

4. The method of claim 1, wherein the intermediate value is determined based on at least one of the number of REs, a number of layers (v), a value (R or AR) corresponding to a code rate, or a modulation order (Qm), the code rate and the modulation order being determined based on a modulation and coding scheme (MCS) included in downlink control information (DCI), and wherein the intermediate value is determined based on at least one of $N_{RE} \cdot Q_m \cdot v \cdot A_R \cdot 2^{-13}$ or $N_{RE} \cdot Q_m \cdot v \cdot R$.

5. The method of claim 1, wherein the size of the transport block is determined based on an integer value of the intermediate value, and wherein the integer value of the intermediate value is determined based on at least one of a floor function, a ceiling function, or a round function.

6. A terminal in a communication system, the terminal comprising:

a transceiver; and at least one processor configured to:

determine a number ($N_{RE}$) of resource elements (REs) allocated to the terminal, determine an intermediate value based on the $N_{RE}$, in case that the intermediate value is greater than or equal to a first reference value, determine a size of a transport block based on the intermediate value and a first equation, in case that the intermediate value is between the first reference value and a second reference value being smaller than the first reference value, determine the size of the transport block based on the intermediate value and a plurality of predetermined values, and in case that the intermediate value is smaller than or equal to the second reference value, determine the size of the transport block based on the intermediate value and a second equation, wherein the first reference value is 3824, and the second reference value is smaller than the first reference value.

7. The terminal of claim 6, wherein, in case that the intermediate value is greater than the first reference value, the first equation depends on whether a value corresponding to a code rate is greater than a predetermined value.

8. The terminal of claim 6, wherein the at least one processor is further configured to:

in case that the intermediate value is smaller than a third reference value being smaller than the second reference value, determine the size of the transport block based on a predetermined value.

9. The terminal of claim 6, wherein the intermediate value is determined based on at least one of the number of REs, a number of layers (v), a value (R or AR) corresponding to a code rate, or a modulation order (Qm), the code rate and the modulation order being determined based on a modulation and coding scheme (MCS) included in downlink control information (DCI), and wherein the intermediate value is determined based on at least one of $N_{RE} \cdot Q_m \cdot v \cdot A_R \cdot 2^{-13}$ or $N_{RE} \cdot Q_m \cdot v \cdot R$.

10. The terminal of claim 6, wherein the at least one processor is further configured to determine the size of the transport block based on an integer value of the intermediate value, and wherein the integer value of the intermediate value is determined based on at least one of a floor function, a ceiling function, or a round function.

\* \* \* \* \*